United States Patent [19]

Watanabe

[11] Patent Number: 5,091,746
[45] Date of Patent: Feb. 25, 1992

[54] IMAGE FORMING APPARATUS IN WHICH EDITING CONTENT FOR MASKING, TRIMMING, AND THE LIKE IS SET IN ADVANCE BY SEPARATE SETTING UNIT AND IMAGE FORMATION IS PERFORMED IN ACCORDANCE WITH EDITING CONTENT SET BY SETTING UNIT

[75] Inventor: Junji Watanabe, Yokohama, Japan

[73] Assignee: Kabushiki Kaisha Toshiba, Kawasaki, Japan

[21] Appl. No.: 720,190

[22] Filed: Jun. 24, 1991

[30] Foreign Application Priority Data

Jun. 26, 1990 [JP] Japan .................................. 2-165602

[51] Int. Cl.⁵ ............................................. G03G 21/00
[52] U.S. Cl. ................................... 355/202; 355/204; 355/210; 355/218; 358/296; 395/100
[58] Field of Search ............... 355/200, 202, 204, 218, 355/209, 208, 210; 364/518, 523; 358/296, 300

[56] References Cited

U.S. PATENT DOCUMENTS

| | | | |
|---|---|---|---|
| 4,655,577 | 4/1987 | Ikuta ................................ | 355/202 X |
| 4,699,501 | 10/1987 | Wantanabe et al. ............... | 355/200 |
| 4,806,978 | 2/1989 | Nakatani et al. .................... | 355/202 |
| 5,016,048 | 5/1991 | Wantanabe ........................ | 355/202 |
| 5,043,762 | 8/1991 | Iwaki et al. ........................ | 355/204 |

Primary Examiner—A. T. Grimley
Assistant Examiner—Sandra L. Braser
Attorney, Agent, or Firm—Foley & Lardner

[57] ABSTRACT

According to this invention, a copying condition such as a masking or trimming area is set in advance by an electronic notebook. When the electronic notebook is loaded on a copying machine, the preset copying condition is transmitted from the electronic notebook to the copying machine. The copying machine performs copying in accordance with the transmitted copying condition. As a result, the electronic notebook and its exclusive IC card can be used as part of the operation panel of the copying machine main body, thereby simplifying the operation panel of the copying machine main body. Since the electronic notebook is portable, the copying condition can be input restfully at an arbitrary place. A telephone number list and a memo list stored in the electronic notebook can be printed out at a high speed. A blue portion of an original not to be reproduced in a copy can be discriminated. Writing of a mark and the like, trimming, and masking can be performed by using the discriminated content.

13 Claims, 28 Drawing Sheets

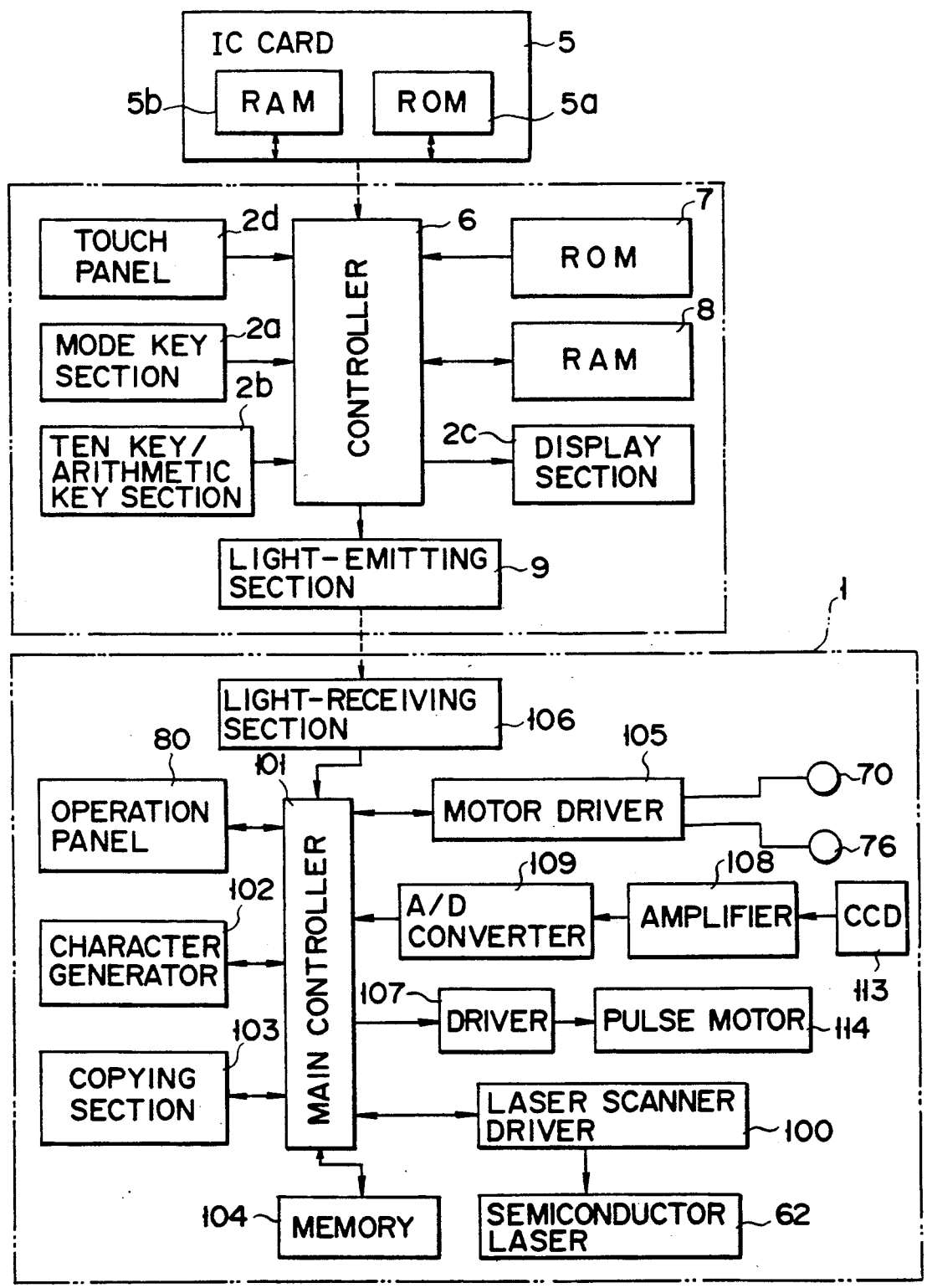
F I G. 1

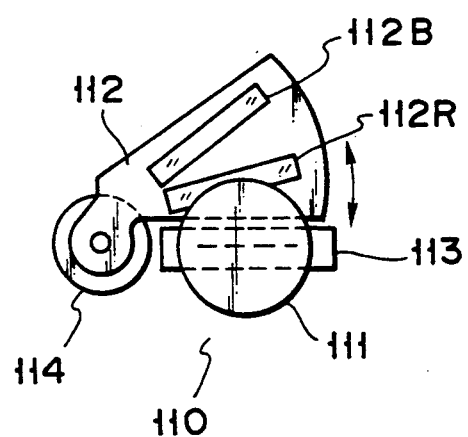
F I G. 6

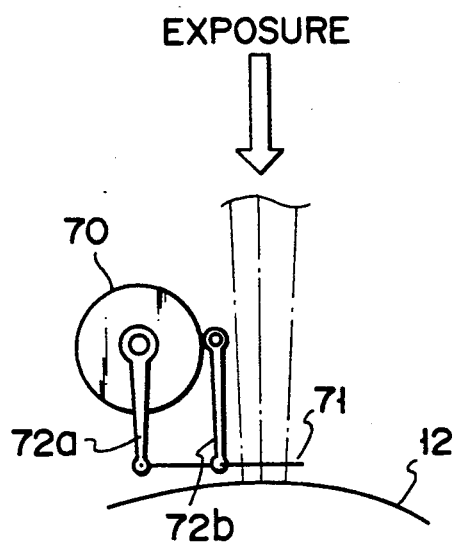
F I G. 13
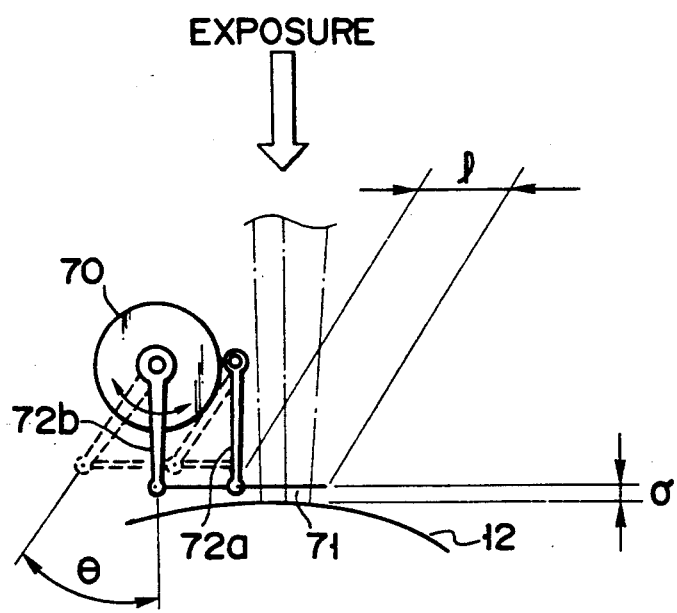
F I G. 14

F I G. 23A
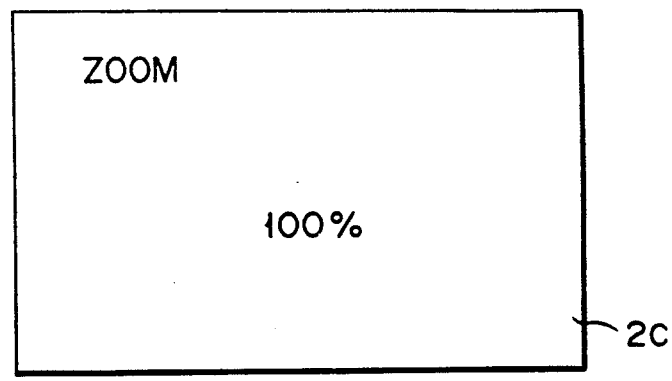
F I G. 23B
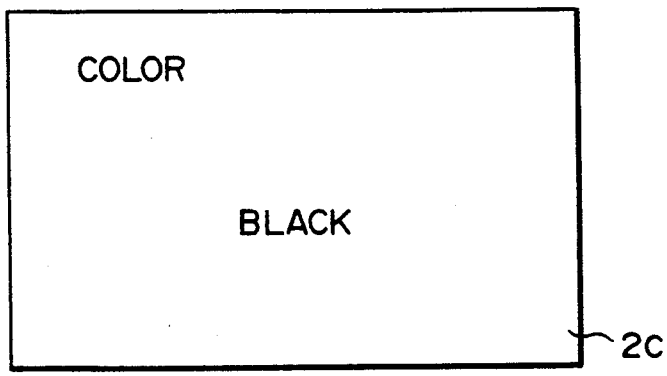
F I G. 23C
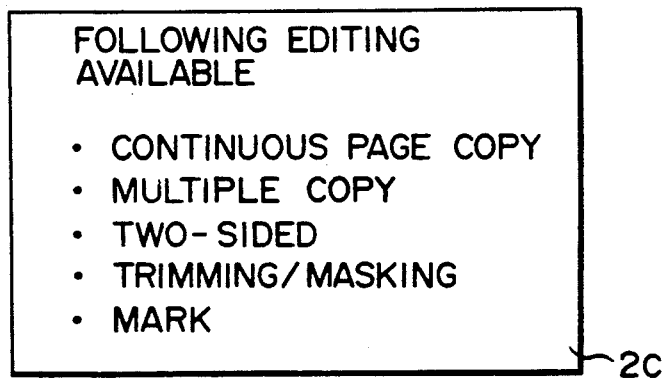
F I G. 23D
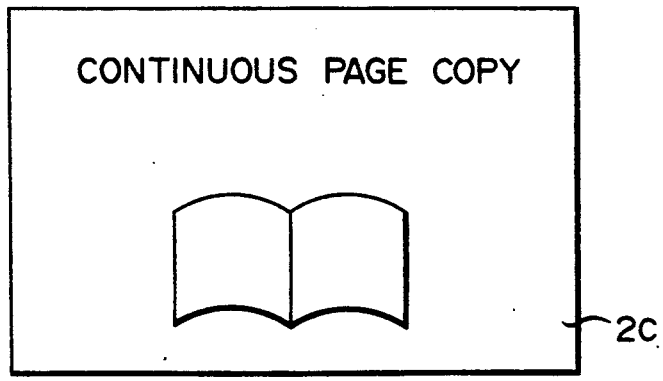

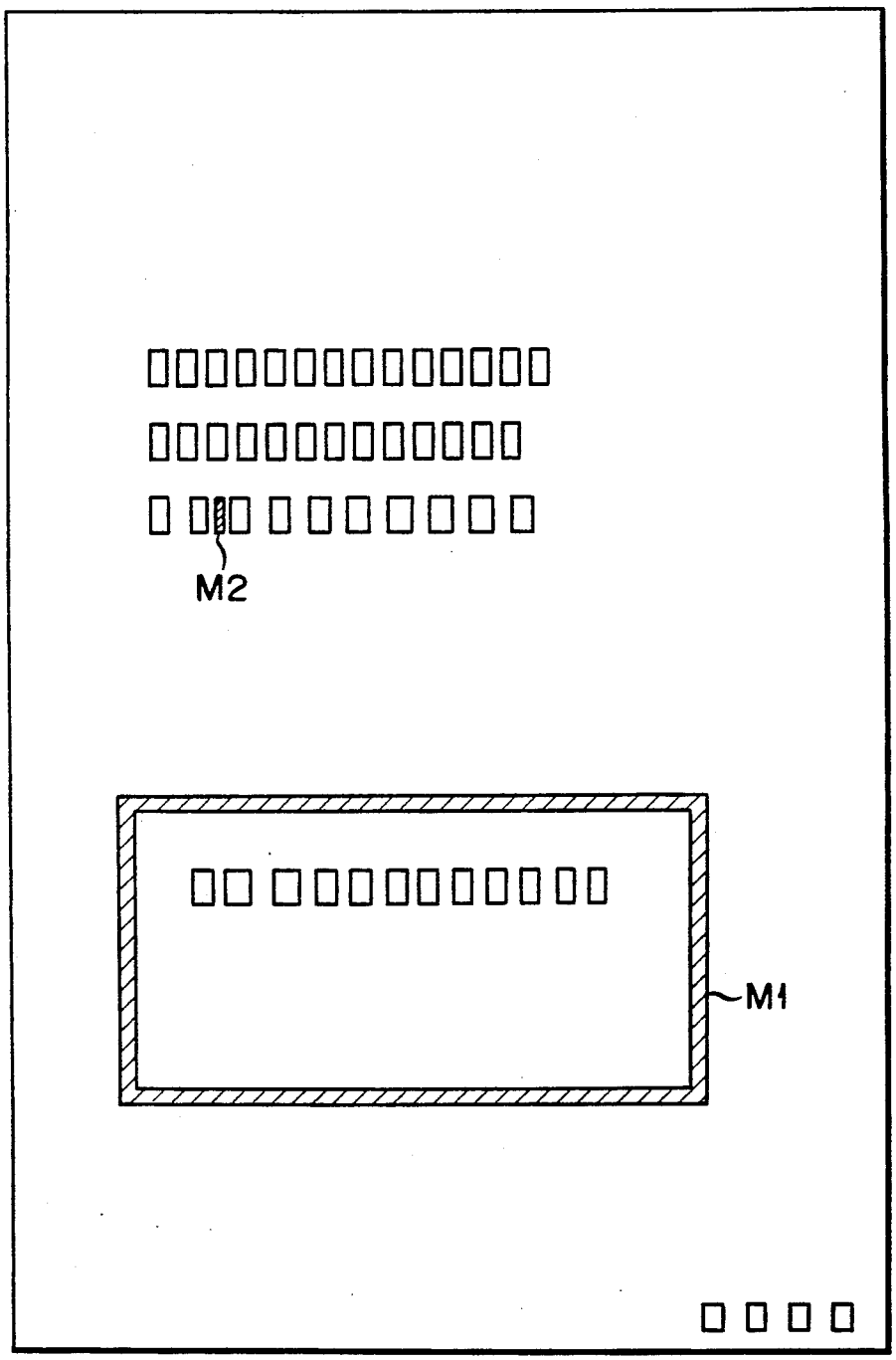
F I G. 25

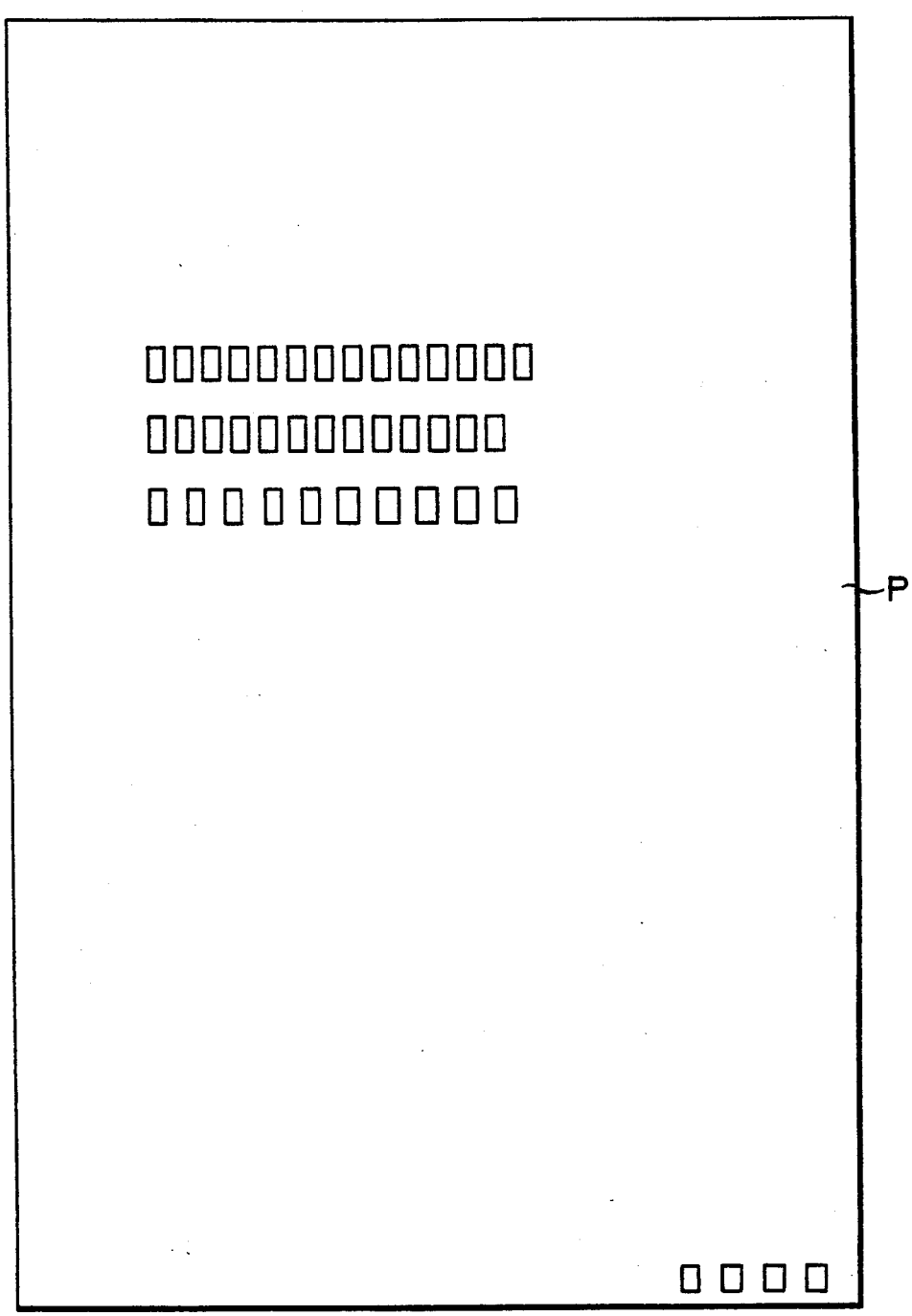
F I G. 26

F I G. 30A

TELEPHONE NUMBER ?

~2c

F I G. 30B

DURING TRANSMISSION

~2c

F I G. 30C

END OF TRANSMISSION

TELEPHONE NUMBER LIST
(NAME) (TELEPHONE NUMBER) (ADDRESS)
OOOO 044-511-4111 OOO OO

MEMO LIST

1. STOCK PRICE (Y5)

OO 1200
   OO 1500

P

IMAGE FORMING APPARATUS IN WHICH EDITING CONTENT FOR MASKING, TRIMMING, AND THE LIKE IS SET IN ADVANCE BY SEPARATE SETTING UNIT AND IMAGE FORMATION IS PERFORMED IN ACCORDANCE WITH EDITING CONTENT SET BY SETTING UNIT

BACKGROUND OF THE INVENTION

1. Field of the Invention

The present invention relates to an image forming apparatus such as a copying machine which has editing functions, e.g., a masking function and a trimming function.

2. Description of the Related Art

A conventional copying machine or the like has editing functions including functions of coping of an original as it is, enlarged- and reduced-size copying, and masking and trimming of part of the original.

In such a copying machine, a copy density, a copy count, and the like are designated at the operation panel. Editing such as masking, trimming, and the like is also designated at the operation panel. For this purpose, various keys are arranged on the operation panel, resulting in a complicated, hard-to-use operation panel.

When editing such as masking, trimming, and the like is to be performed, the editing area is input by way of its coordinates with ten keys or a digitizer. An input operation of the area takes time. The copying machine is occupied by an operator during this input operation and cannot be used by others.

In this manner, the operation panel is complicated and hard to use, and an area input operation takes time to disable others to use the copying machine.

SUMMARY OF THE INVENTION

It is an object of the present invention to provide an image forming apparatus wherein the operation panel is simplified and a time not allowing others to use it due to an area input is eliminated.

It is another object of the present invention to provide an image forming apparatus wherein an image forming condition can be input restfully at a place different from the place where the image forming apparatus is installed.

It is still another object of the present invention to provide an image forming apparatus wherein a telephone number list or a memo list stored in an electronic notebook can be printed out at a high speed.

It is still another object of the present invention to provide an image forming apparatus wherein a blue portion of an original not reproduced in a copy is discriminated, and writing of a mark and the like, trimming, and masking can be performed by using this discrimination content.

The present invention comprises:

means for forming an image on an image carrier under predetermined conditions;

means for storing data representing the predetermined conditions under which the image forming means is to form an image;

means, detachably connected to the image forming means, for supporting the storing means;

means, attached to the supporting means, for changing the data stored in the storing means, when the supporting means is detached from the image forming means; and means for setting conditions under which the image forming means is to form an image and which are represented by the data stored in the storing means, when the supporting means is attached to the the image forming means.

The present invention also comprises:

means for forming an image on an image carrier under predetermined conditions;

first storing means for storing data representing the predetermined conditions under which the image forming means is to form an image;

means, detachably connected to the image forming means, for supporting the first storing means;

means, attached to the supporting means, for changing the data stored in the first storing means, when the supporting means is detached from the image forming means;

means for setting conditions under which the image forming means is to form an image and which are represented by the data stored in the first storing means, when the supporting means is attached to the the image forming means;

means for receiving the data stored in the first storing means;

second storing means for storing the data received by the data receiving means; and means for resetting the data stored in the second storing means corresponding to an operation which the supporting means is detached from the image forming means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing the overall arrangement of an image forming apparatus;

FIGS. 5 to 7 are views showing the arrangement of a reader section;

FIG. 13 is a sectional view of a shutter;

FIGS. 14 and 17 are views for explaining the operation of the shutter;

FIGS. 23A to 23H show display examples when an editing condition is to be input by the electronic notebook;

FIG. 25 is a view for explaining a state in which a partial blue ink printing area is designated on an original;

FIG. 26 shows a printout example of a copy when masking is performed;

FIGS. 30A to 30C show display examples when the telephone number list is to be transmitted by the electronic notebook; and FIGS. 31A to 31B show printout examples of the copying machine.

DETAILED DESCRIPTION OF THE PREFERRED EMBODIMENTS

FIG. 1 shows the overall arrangement of an image forming apparatus according to the present invention.

This image forming apparatus is constituted by a copying machine 1 and an electronic notebook (setting unit) 2 connected to the copying machine 1.

Figure 2:
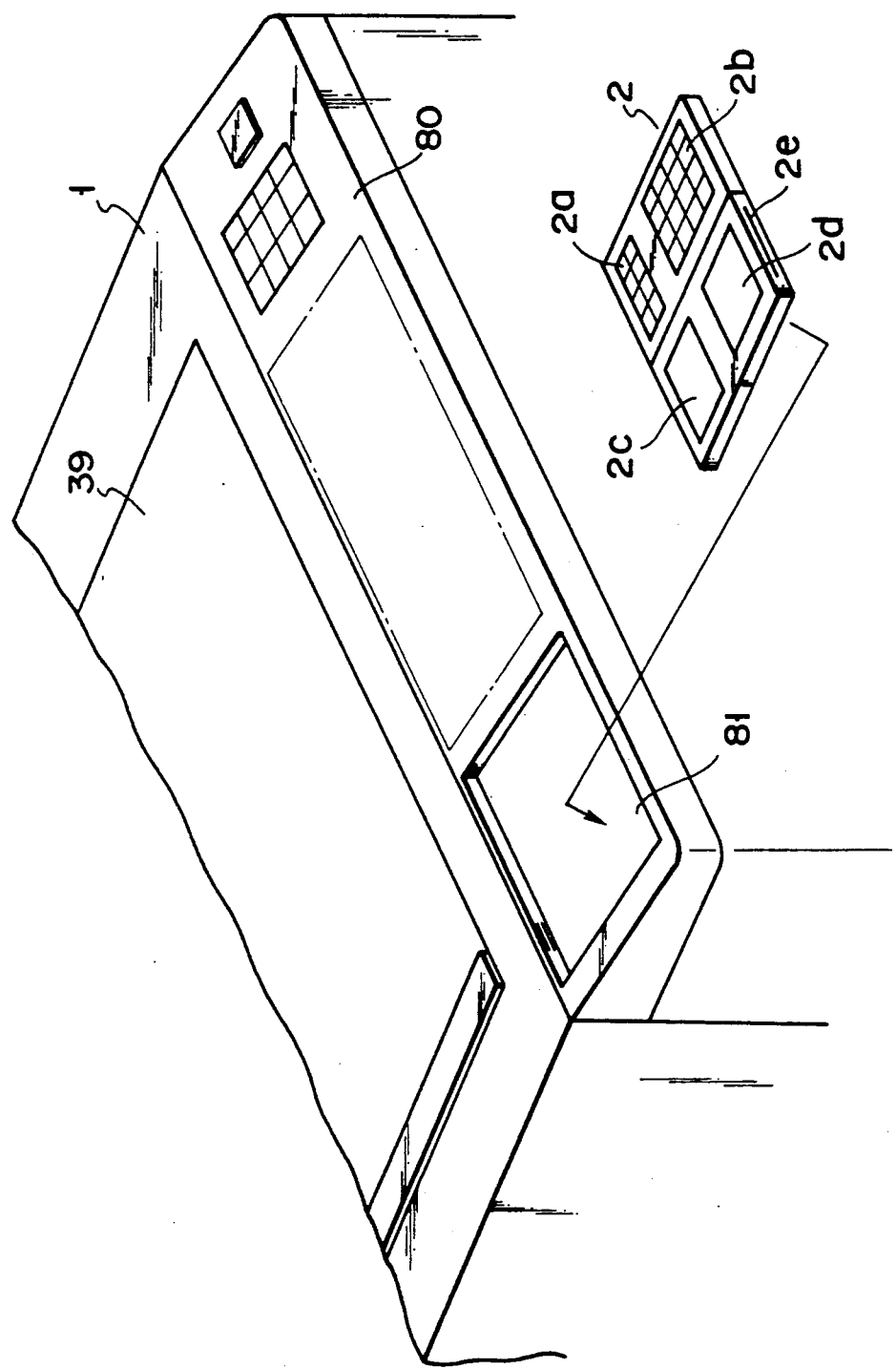
FIGS. 2, 24 and 29 are views for explaining mounting of an electronic notebook on a retainer of the apparatus main body.

For example, as shown in FIG. 2, when the electronic notebook 2 is mounted in a recessed portion (main body retainer) 81 provided beside an operation panel 80 on an upper portion of the copying machine 1, a light-receiving section 106 (to be described later) in the copying machine 1 opposes a light-emitting section (to be described later) 9 in the electronic notebook 2, and the copying machine 1 and the electronic notebook 2 are thus connected.

The electronic notebook 2 can be operated either at a place remote from the copying machine 1 or as it is mounted on the copying machine 1.

Figure 3:
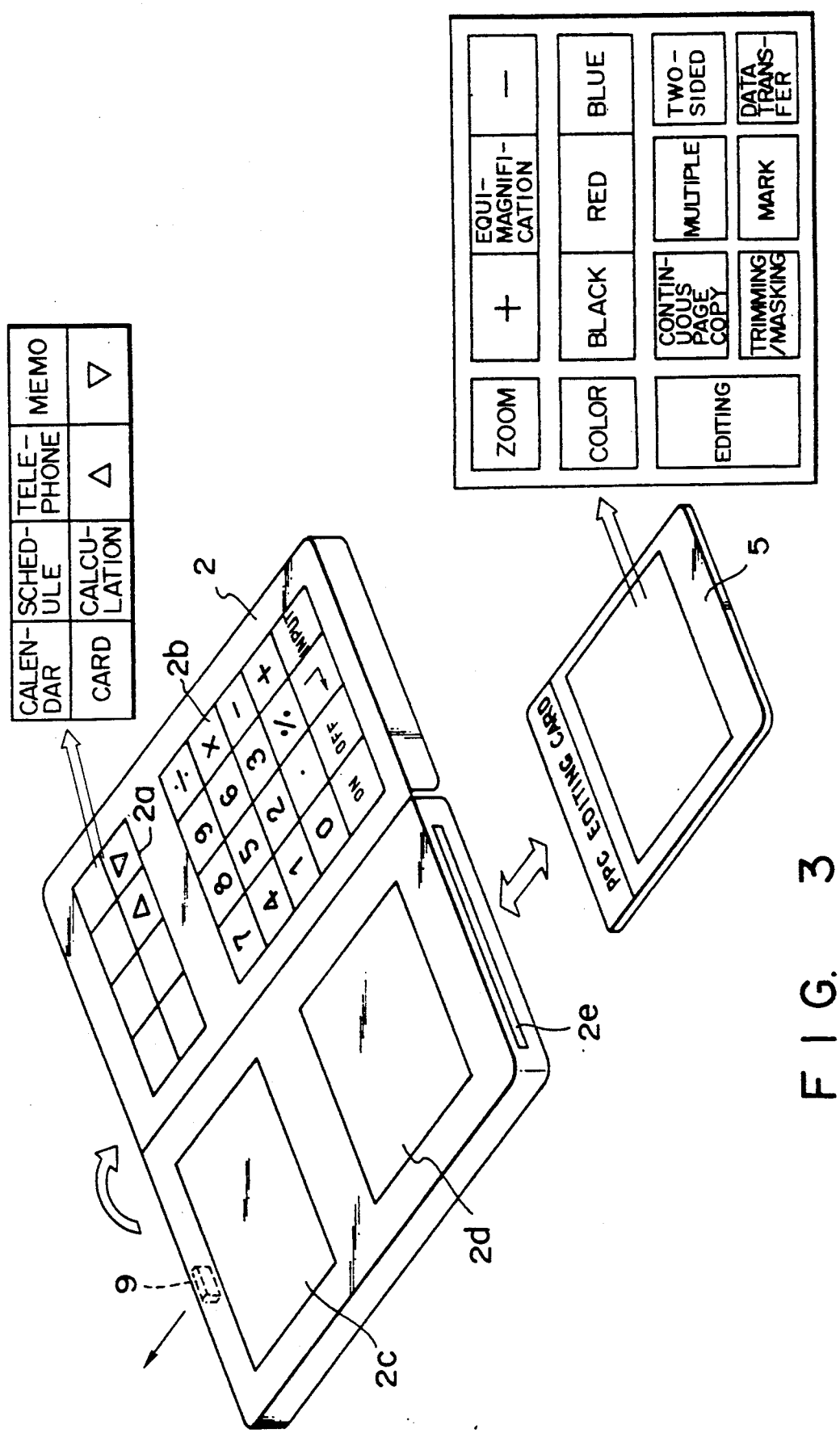
FIG. 3 is a perspective view of the arrangement of an electronic notebook and a PPC editing card.

The electronic notebook 2 comprises a mode key section 2a, a ten key/arithmetic key section 2b, a display section 2c for displaying various data, a transparent touch panel 2d, and a card insertion port 2e, as shown in FIG. 3.

The mode key section 2a comprises keys for selecting calendar, schedule, telephone, memo, card, and calculation modes, and switching keys (an increment key and a decrement key) for designating switching of the display content of the display 2c to the previous or following display content.

The ten key/arithmetic key section 2b comprises ten keys four fundamental rules of arithmetical operation keys, an ON key, an OFF key, a return key, an input key, and the like.

The touch panel 2d enables key inputs corresponding to the contents described on the surface of various types of IC cards 5 inserted from the card insertion port 2e.

The various types of IC cards 5 can be inserted in the card insertion port 2e. For example, a PPC (Popular Paper Copy) editing card 5 storing a control program corresponding to the editing function of the copying machine 1 is prepared.

The contents of the keys at the touch panel 2d are described on the surface of the PPC editing card 5. For example, items "zoom", "+", "equi-magnification", "−", "color", "black", "red", "blue", "editing", "continuous page copy", "multiple", "two-sided", "trimming/masking", "mark", and "data transfer" are described on the surface of the PPC editing card 5.

The PPC editing card is set by being inserted in the card insertion port 2e. When the PPC editing card is depressed in this state, the designation contents corresponding to depressed portions of the PPC editing card 5 are as follows.

When a portion corresponding to "zoom" is depressed, a zoom mode is designated.

When a portion corresponding to "+" is depressed, an increase in copying magnification (enlargement in units of 1%) is designated.

When a portion corresponding to "equi-magnification" is depressed, the copying magnification is designated to be set to equi-magnification.

When a portion corresponding to "−" is depressed, a decrease in copying magnification (reduction in units of 1%) is designated.

When a portion corresponding to "color" is depressed, a color mode is designated.

When a portion corresponding to "black" is depressed, a black copy mode is designated.

When a portion corresponding to "red" is depressed, a red copy mode is designated.

When a portion corresponding to "blue" is depressed, a blue copy mode is designated.

When a portion corresponding to "editing" is depressed, an editing mode is designated.

When a portion corresponding to "continuous page copy" is depressed, a continuous page copy mode is designated.

When a portion corresponding to "multiple" is depressed, a multiple copy mode is designated.

When a portion corresponding to "two-sided" is depressed, a two-sided copy mode is designated.

When a portion corresponding to "trimming/masking" is depressed, trimming or masking is designated.

When a portion corresponding to "mark" is depressed, insertion of various marks is designated.

When a portion corresponding to "data transfer" is depressed, transfer of a telephone number, memory content, and the like is designated.

Figure 4:
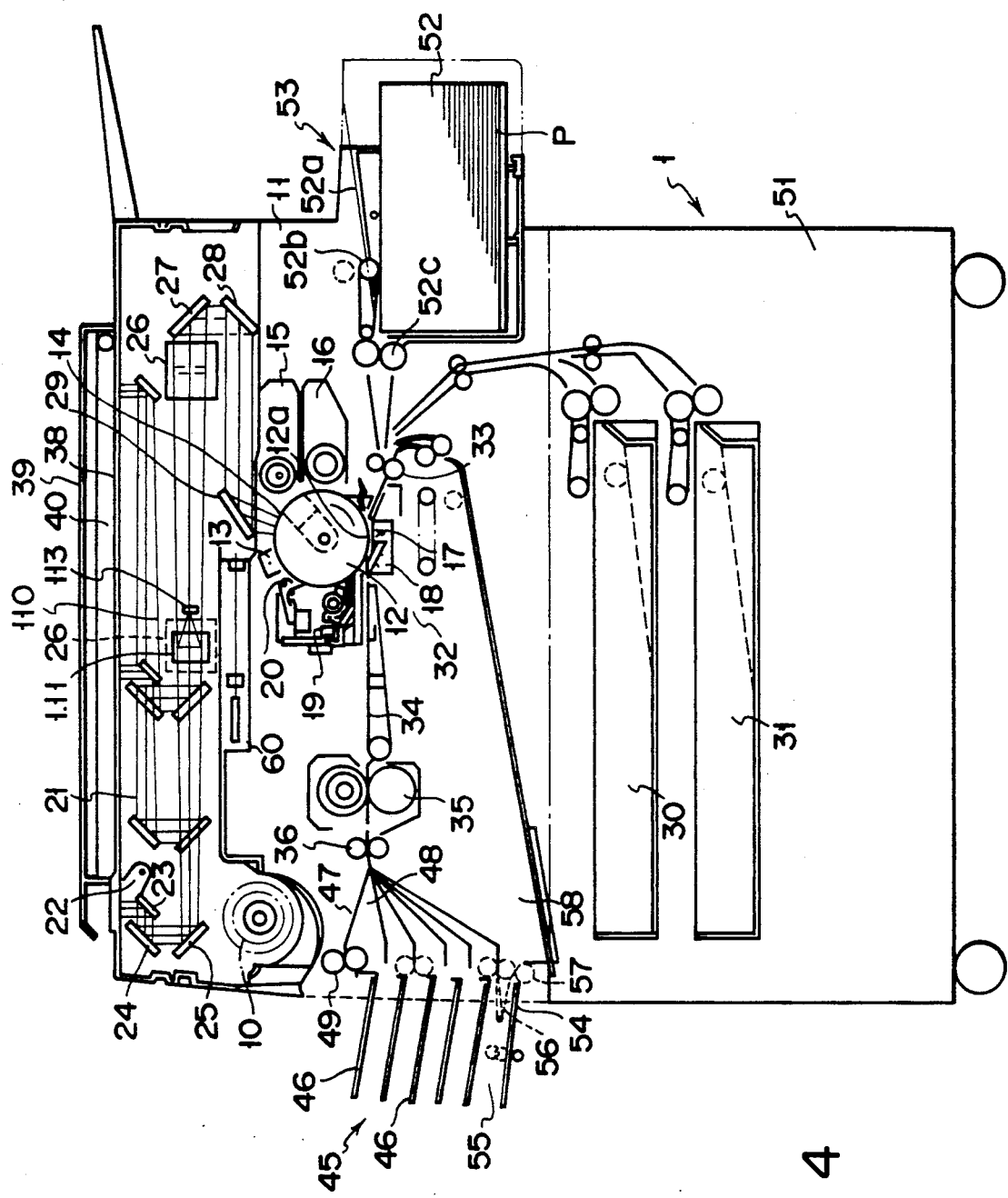
FIG. 4 is a sectional view showing the internal arrangement of the copying machine.

FIG. 4 shows the internal arrangement of the copying machine 1. Referring to FIG. 4, a photosensitive drum (image carrier) 12 is rotatably provided at substantially the central portion in a main body 11. A charger 13, an exposing section 14, developing units 15 and 16, a transfer charger 17, a separation charger 18, a cleaner 19, and a discharger 20 are sequentially arranged around the photosensitive drum 12 in the order of its rotating direction.

An exposing system (optical means) 21 is provided in the upper portion of the main body 11. The exposing system 21 comprises an exposure lamp 22, first to third reflecting mirrors 23, 24, and 25, a variable magnification lens block 26, and fourth to sixth reflecting mirrors 27, 28, and 29.

Figure 5:
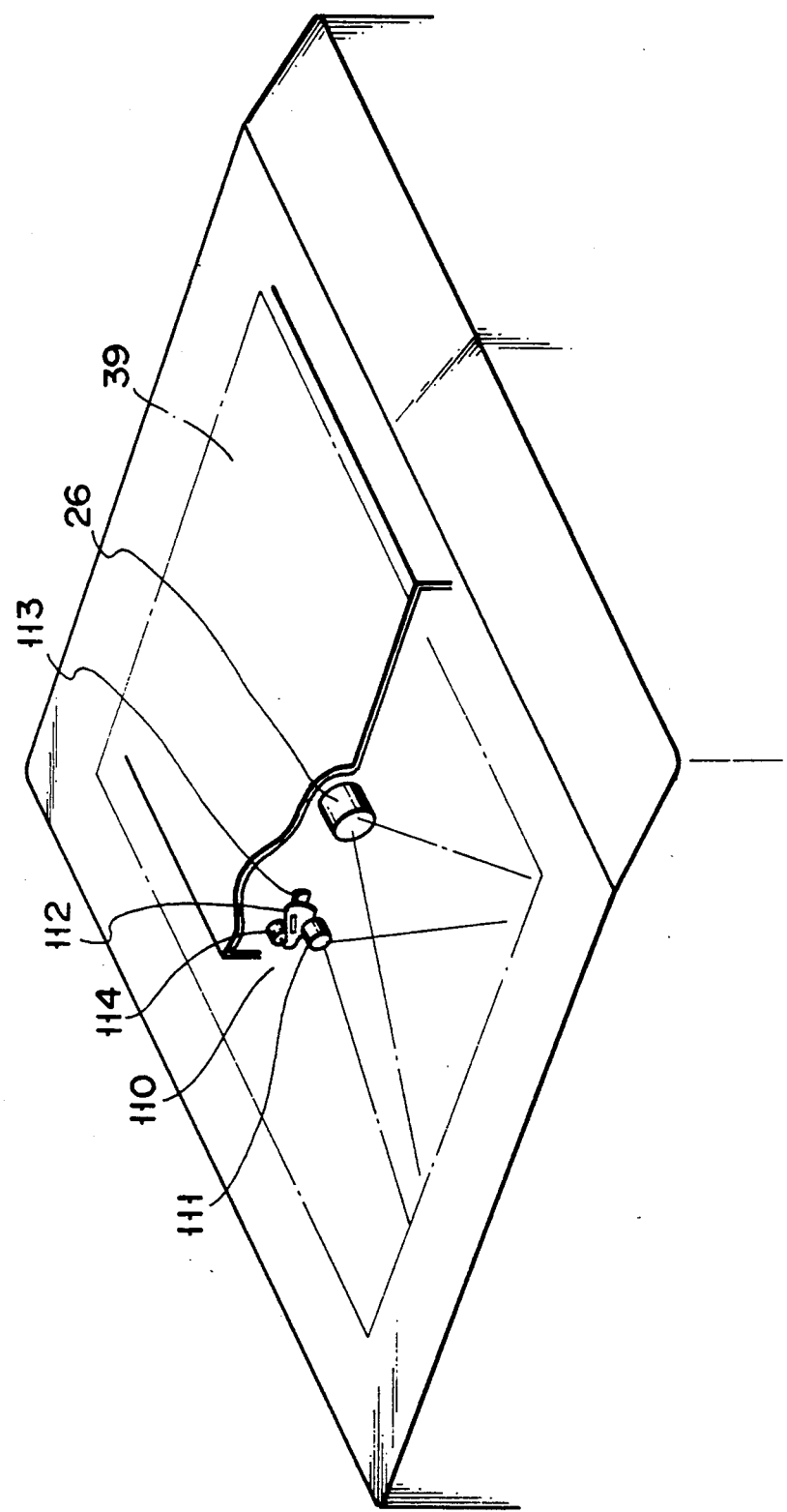
Figure 7:
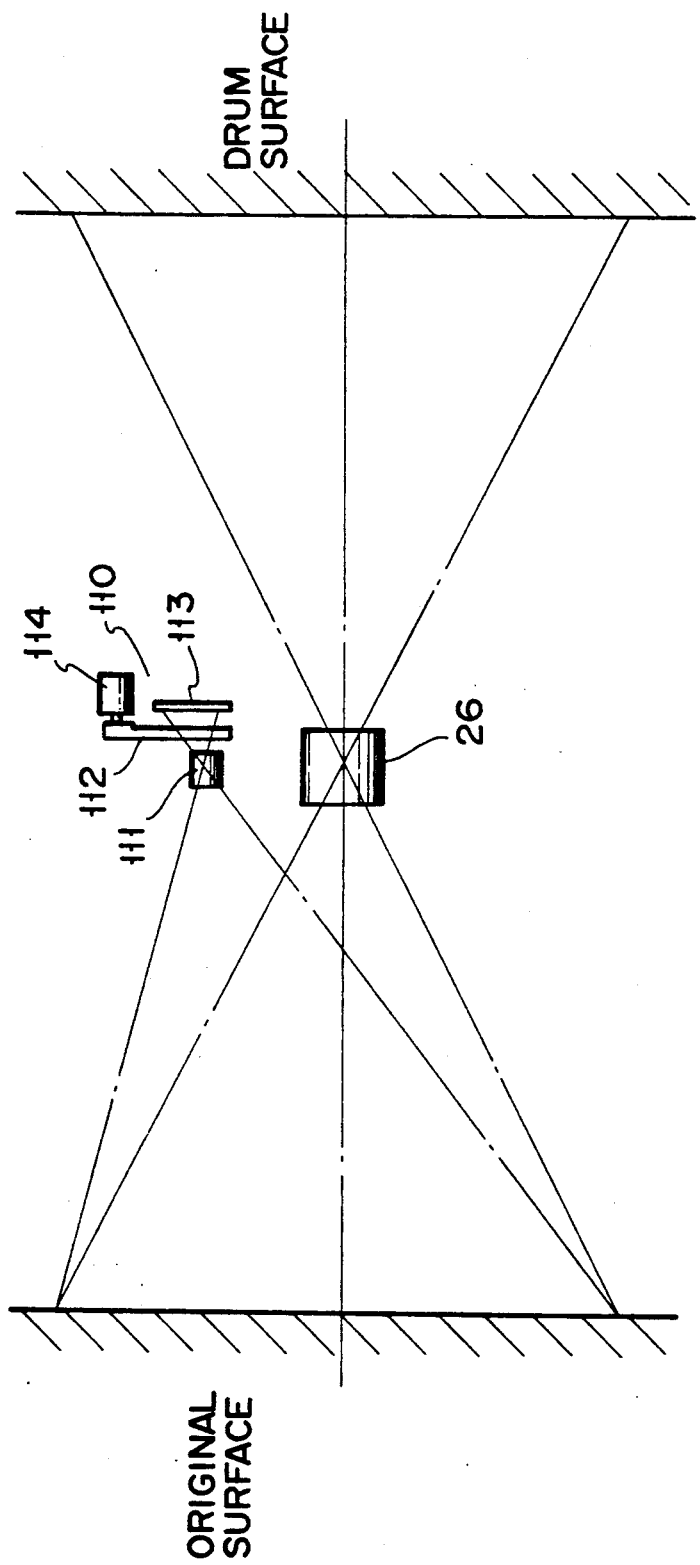

A reader section 110 as shown in FIGS. 5 to 7 is provided in the vicinity of the variable magnification lens block 26. The reader section 110 comprises a lens 111 for guiding an optical image from the original, a filter 112, a CCD 113 for outputting an electrical signal corresponding to a focused optical image, and a pulse motor 114 for driving the filter 112.

The filter 112 consists of, e.g., a blue filter 112B and a red filter 112R. When the pulse motor 114 drives to rotate the filter 112, the blue or red filter 112B or 112R is inserted in or removed from the optical path between the lens 111 and the CCD 113.

Then, the optical image from the lens 111 is guided to the CCD 113 directly or through the blue or red filter 112B or 112R.

A laser unit 60 for writing character data by laser light is provided between a portion under the exposing system 21 and a portion above the photosensitive drum 12 and a fixing unit 35. The laser unit 60 writes character data on the photosensitive drum 12.

The main body 11 is mounted on a desk 51 to be capable of being separated. Paper feed cassettes 30 and 31 are provided in the desk 51 to be detachable from the front side.

A large-capacity paper feed unit (LCF) 52 for storing more than 1,000 sheets is provided at a side portion of the main body 11. A manual feed section 53 is provided on the upper surface of the large-capacity paper feed unit 52. When most frequently used paper sheets (e.g., A4 sheets) P are set in the large-capacity paper feed unit (LCF) 52, a paper run-out frequency can be decreased.

The large-capacity paper feed unit 52 has an upper cover 52a. The upper cover 52a also serves as the guide for the manual feed section 53. The large-capacity paper feed unit 52 also has a paper feed roller 52b and paper separation rollers 52c. The paper feed roller 52b and the paper separation rollers 52c also serve as a paper feed roller and paper separation rollers, respectively, of the manual paper feed section 53.

A paper sheet P supplied by the paper feed cassette 30 or 31, the large-capacity paper feed unit (LCF) 52, or the manual paper feed section 53 is fed along a sheet feed path 32 provided in the main body 11.

Resist rollers 33, a transfer charger 17, a separation charger 18, a conveyor belt 34, a fixing unit 35, and a paper discharge roller pair 36 are sequentially arranged along the feed direction 32 of the paper sheet P.

An original table 38 is provided on the upper surface of the main body 11, and a platen cover 39 is provided on the original table 38. A platen sheet 40 is provided inside the platen cover 39.

A sorter unit 45 is integrally incorporated in the paper discharge section of the main body 11. The sorter unit 45 comprises a plurality of bins 46 vertically provided with predetermined gaps, and a gate means 47 provided between the bins 46 and the paper discharge roller pair 36.

The gate means 47 has an extendible pivot guide member 48. A discharge roller pair 49 is provided at a pivot end of the guide member 48.

A reverse tray 54 constituting a continuous reverse means 53 together with the gate means 47 is provided under the bins 46. A reverse roller 55 vertically movable and rotatable in the forward/reverse directions, and a pivotal switching gate 56 are provided on the reverse tray 54. An idle roller 57 as a feed roller is provided below the discharge roller pair 49.

When the gate means 47 is moved to the lowermost stage, the discharge roller pair 49 rotatably contacts the idle roller 57 so that the idle roller 57 serves as the paper discharge roller of a stacker 58. As a result, the paper sheet P is directly fed into the stacker 58.

In the normal copy mode, light is scanned on the original placed on the original table 38 by the exposure system 21. Light reflected by the original is focused on the photosensitive drum 12 whose surface is charged by the charger 13, thus forming an electrostatic latent image on the photosensitive drum 12. The electrostatic latent image is visualized when a developing agent is supplied from the developing unit 15 or 16.

At this time, when a paper sheet P is supplied from the paper feed cassette 30 or 31, the large-capacity paper feed unit 52, or the manual paper feed unit 53, it is fed to an image transfer section 12a between the photosensitive drum 12 and the transfer charger 17, and the visual image on the photosensitive drum 12 is transferred onto the paper sheet P.

The paper sheet P having the transferred image is separated from the photosensitive drum 12 by the separation charger 18 and fed to the fixing unit 35 by the conveyor belt 34 for fixing the image on it. The paper sheet P having the fixed image is discharged through the paper discharge roller pair 36. The paper sheet P is then discharged onto the uppermost bin 46 through the gate means 47 of the sorter unit 45.

When a plurality of copies of an original are to be obtained and sorted out, the gate means 47 is vertically pivoted so that the copies are selectively fed to the respective bins 46 through the discharge roller pair 49 and sorted out.

When two-sided copy is to be performed, the gate means 47 is pivoted to the lowermost stage, and the lower roller of its discharge roller pair 49 contacts the idle roller 57. At the same time, the reverse roller 55 and the switching gate 56 are moved upward. Then, the paper sheet P with an fixed image fed from the fixing unit 35 is fed onto the reverse tray 54 through the discharge roller pair 49.

Subsequently, when the reverse roller 55 is moved downward as it is rotated in the reverse direction to contact the paper sheet P and the trailing end of the paper sheet P escapes from the discharge roller pair 36, the reverse roller 55 is stopped, and the gate 56 is pivoted downward. The paper sheet P is dropped by the pivoting end of the gate 56.

Then, the reverse roller 55 is rotated in the reverse direction, and the paper sheet P is fed to be clamped between the discharge roller pair 49 and the idle roller 57, and is conveyed.

When the paper sheet P is clamped and conveyed in this manner, the switching gate 56 and the reverse roller 55 are moved upward. At this time, the following paper sheet P is fed to the discharge roller pair 49 and is fed onto the reverse tray 54 as it overlaps the previous paper sheet P. The previous paper sheet P is clamped and conveyed by the discharge roller pair 49 and the idle roller 57 and directly guided to the stacker 58.

Figure 8:
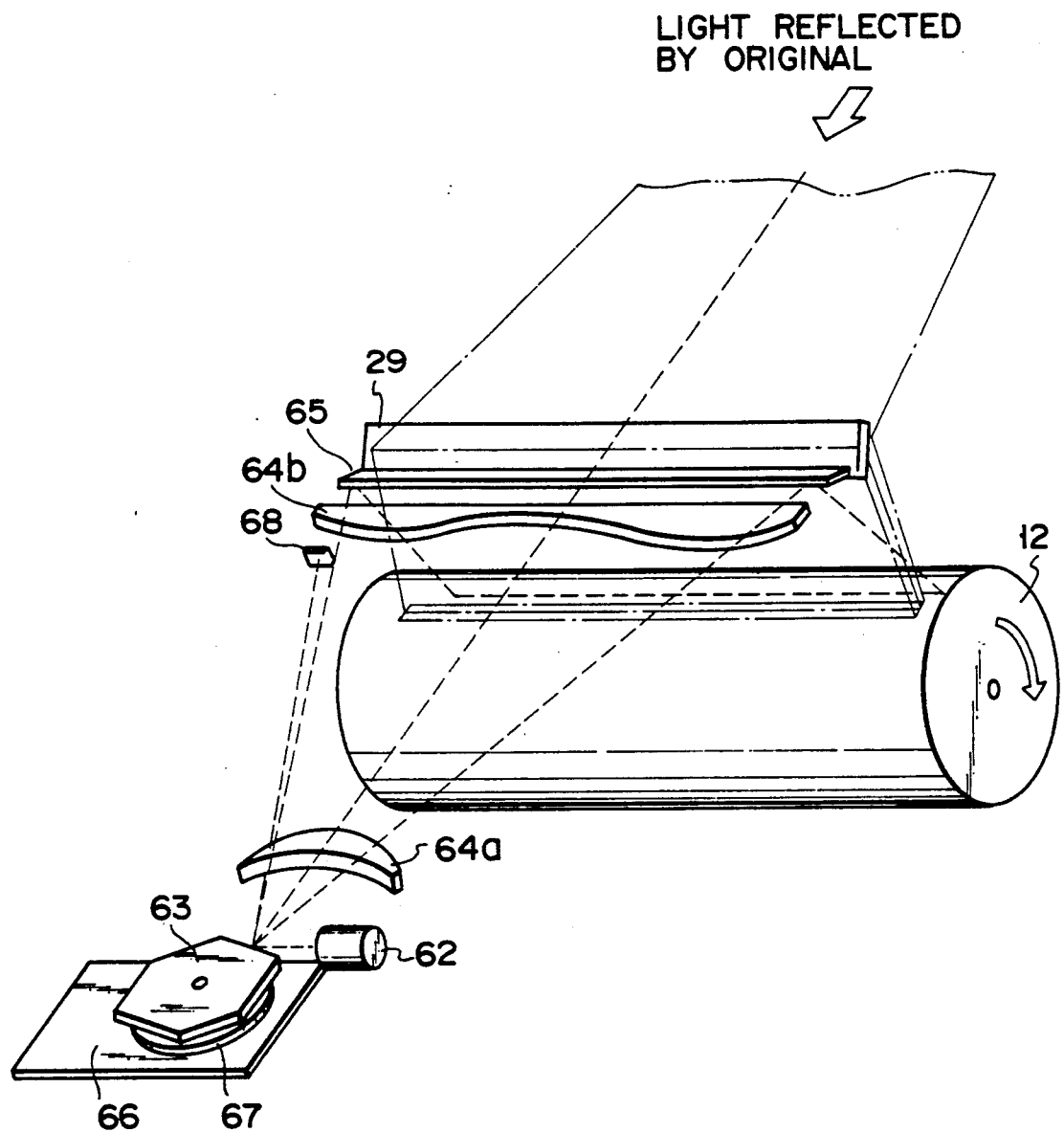
FIGS. 8 and 9 are perspective views showing the arrangement of a laser unit.
Figure 9:
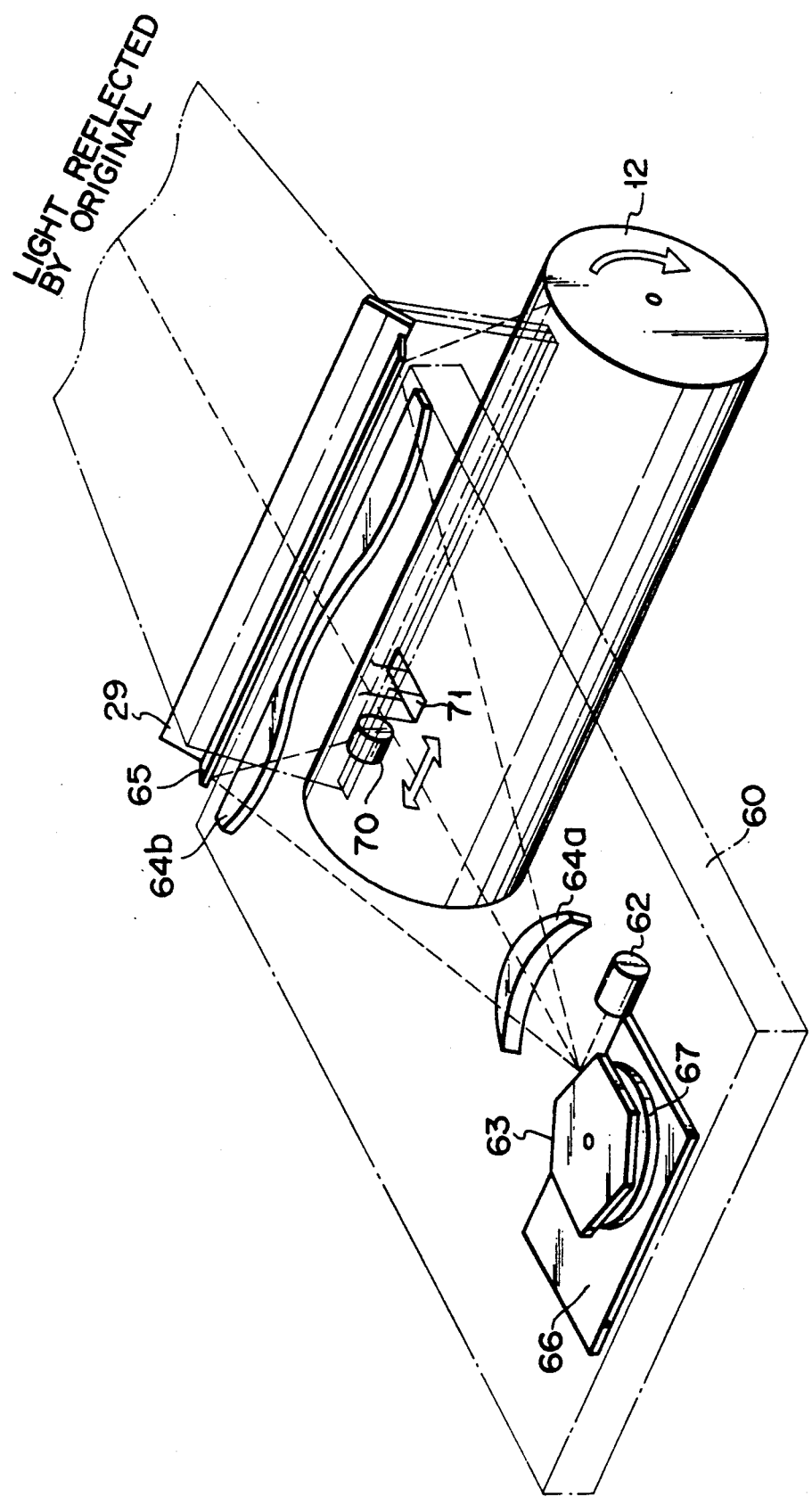

FIGS. 8 and 9 show the arrangement of a laser scanner of the laser unit 60 described previously.

The laser unit 60 has a semiconductor laser 62 as a laser light emitting source. The semiconductor laser 62 is shown in the left-hand side of the drawings. The laser light emitted by the semiconductor laser 62 is incident on a polygon mirror 63 which has a shape of an octagon and performs a predetermined rotation. The incident laser light is reflected by the polygon mirror 63 and irradiates the photosensitive drum 12 as it is reflected by the mirror 65 through focusing lenses 64a and 64b. As a result, a visual image of character data is formed on the photosensitive drum 12.

The laser scanner has, in addition to the polygon mirror 63 described above, a sensor 68 for detecting the main scanning direction (horizontal synchronization) of the laser light. The laser scanner also has a motor board 66 supporting the polygon mirror 63 and a motor rotor 67 coupled to the rotating shaft of the polygon mirror 63.

The focusing lenses 64a and 64b are made of a plastic which is inexpensive and easy to machine.

The light emitted by the exposure system 21 and reflected by the original to read it is reflected by a mirror 29, adjacent to the mirror 65 in the horizontal direction, and irradiates the photosensitive drum 12. Then, a latent image corresponding to the reflected light is formed on the photosensitive drum 12.

Figure 10:
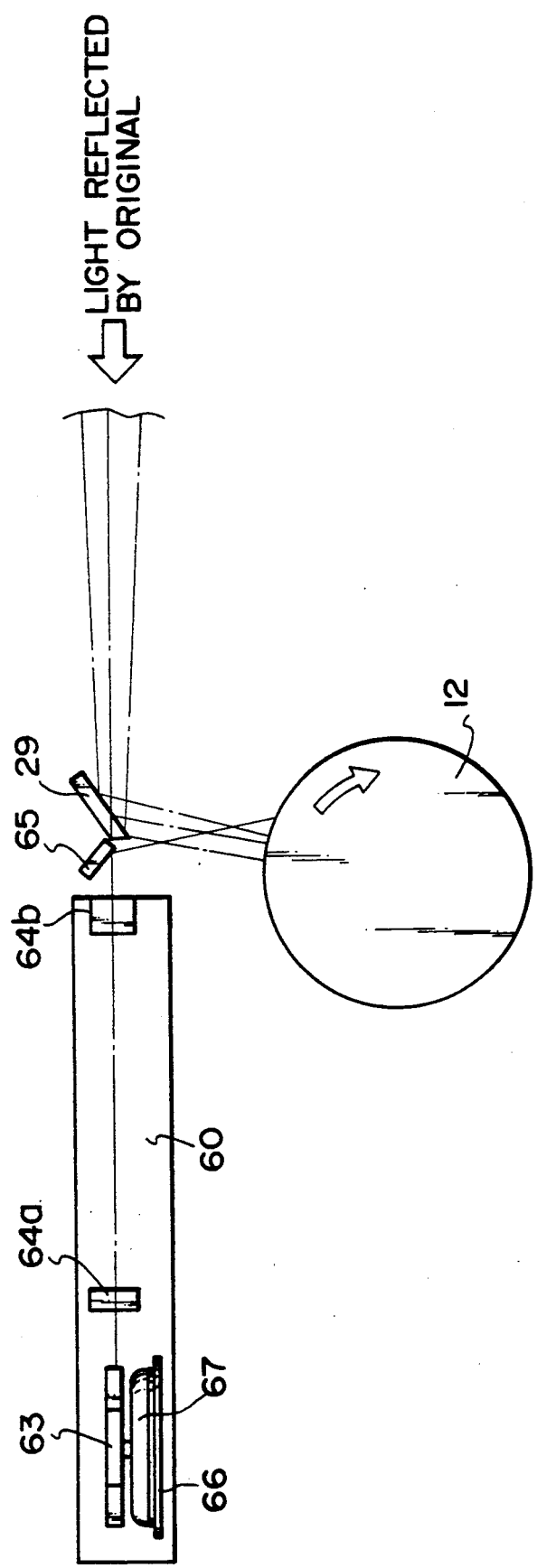
FIG. 10 is a sectional view showing the arrangement of the laser unit.

The sectional view of the laser unit 60 is shown in FIG. 10. Light reflected by the original located at the right end in FIG. 10 is reflected by the mirror 29 and irradiates the photosensitive drum 12. Therefore, a latent image corresponding to the reflected light is formed on the photosensitive drum 12.

The laser light emitted by the semiconductor laser 62 irradiates the photosensitive drum as it is reflected by the mirror 65 through the polygon mirror 63 and the focusing lenses 64a and 64b. Then, a character data latent image corresponding to the reflected light is formed on the photosensitive drum 12.

The arrangement of a movable shutter section which is a movable member of the present invention will be described with reference to FIG. 11.

The movable shutter section has a pulse motor 70 and a shutter 71. When the movable shutter section is reciprocated in a direction of a arrow in FIG. 11. i.e.. in the longitudinal direction of the photosensitive drum 12, character writing is performed.

Figure 12:
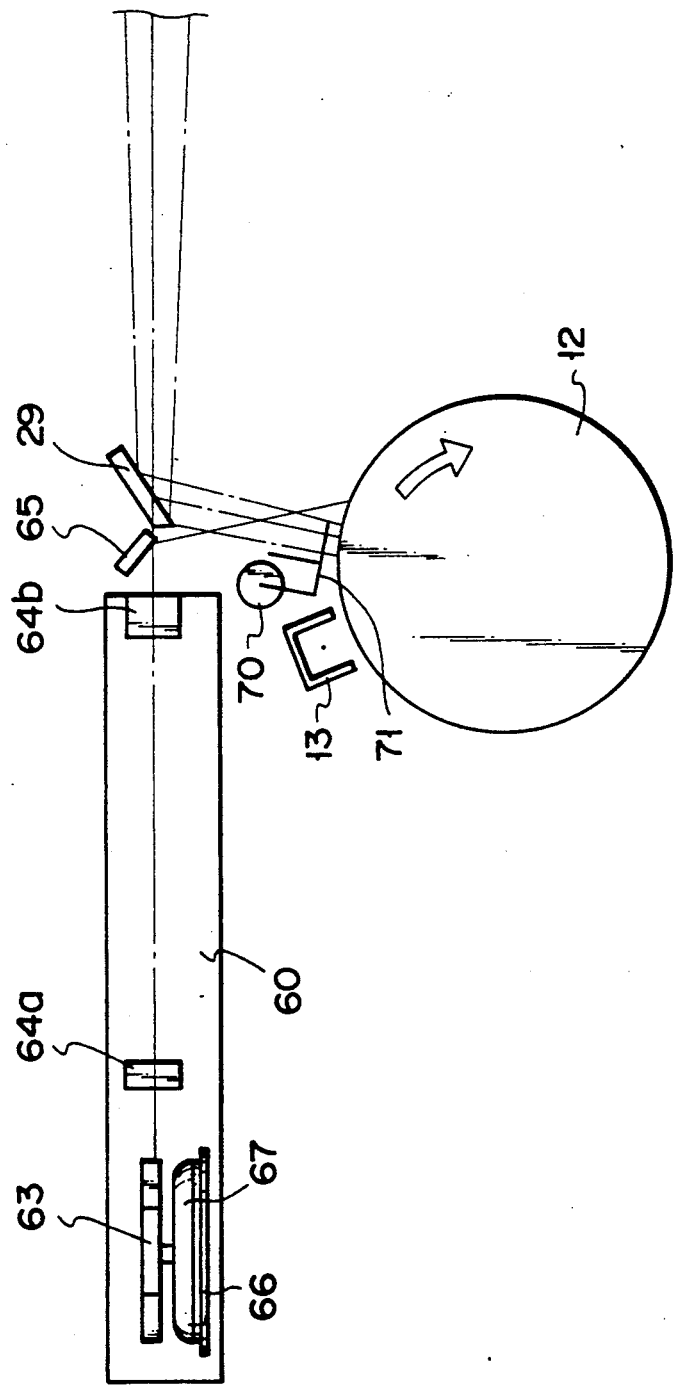
FIGS. 12 and 16 are sectional views showing the arrangement of the laser unit and the shutter unit.

The character writing operation will be described with reference to FIGS. 12 to 14. When character writing is to be performed, the pulse motor 70 is rotatably driven to pivot levers 72a and 72b coupled to the rotating shaft of the pulse motor 70. The shutter 71 is then moved by a distance l of FIG. 14 to block the light reflected by the original. Then, the light reflected by the original irradiates the photosensitive drum 12, and a latent image of the original is formed on the photosensitive drum 12.

When the shutter 71 is moved by a distance l, the pulse motor 70 is driven to rotate through an angle $\theta$. The distance between the shutter 71 and the photosensitive drum 12 is $\alpha$.

Since the shutter 71 is moved at a high speed by the pulse motor 70, blocking and unblocking of the light reflected by the original are also performed at a high speed. As a result, a character around a written character can be prevented from being masked due to an error in timing of the shutter operation, unlike in the conventional case.

Figure 15:
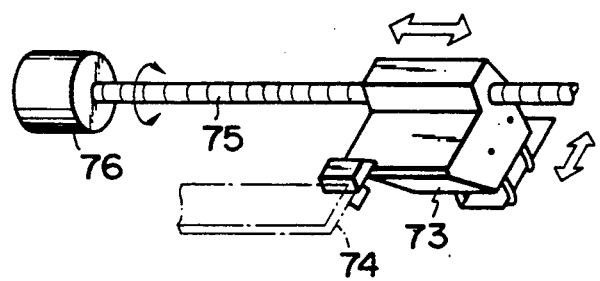
FIG. 15 is a perspective view showing the arrangement of the shutter unit.

FIG. 15 shows the arrangement of a shutter unit 73 having the movable shutter section described above.

Figure 11:
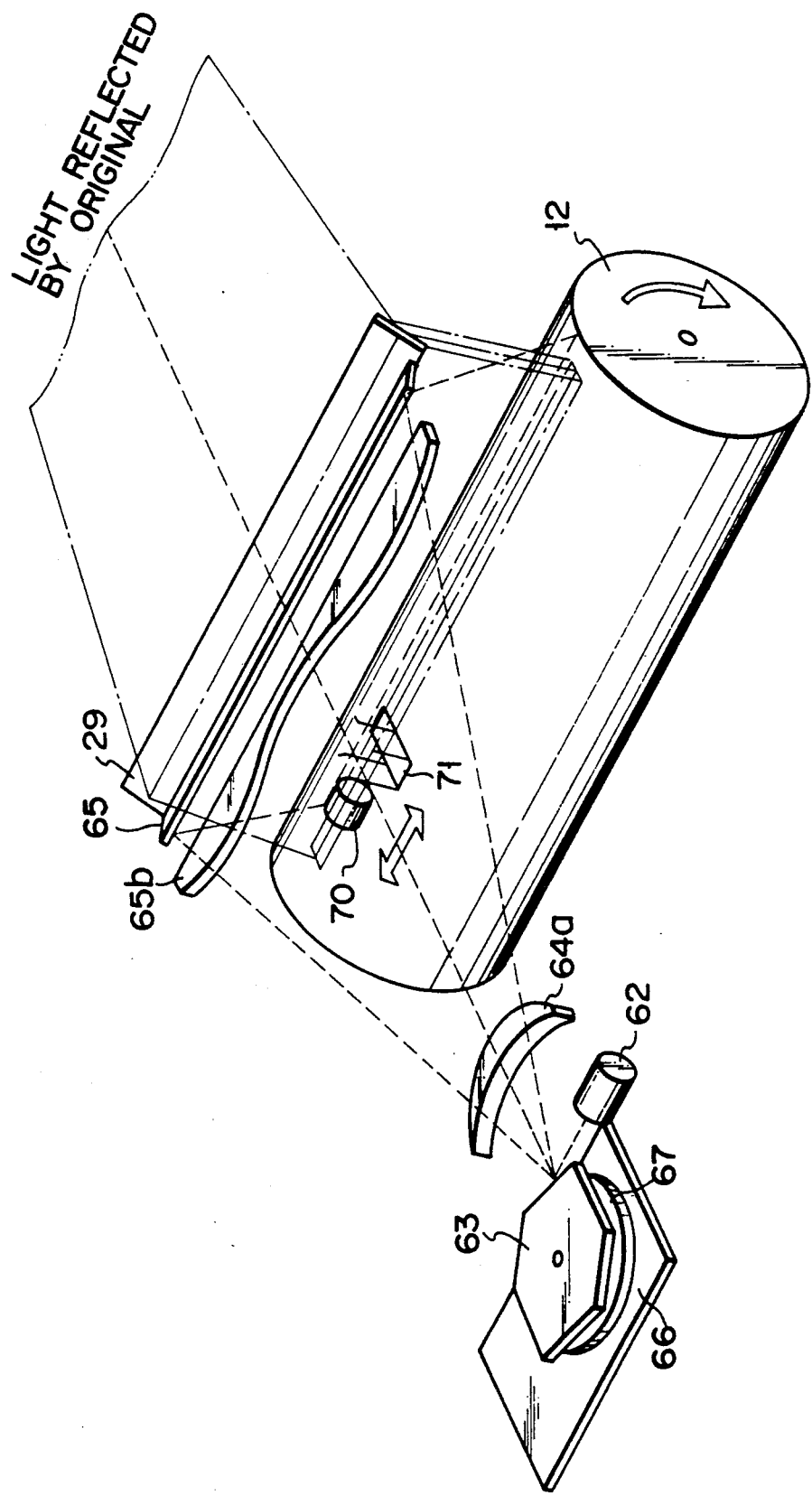
FIG. 11 is a perspective view showing the arrangement of the laser unit and a shutter unit.

The shutter unit 73 has the pulse motor 70 and the shutter 71 shown in FIG. 11. The shutter unit 73 is coupled to a lead screw 75. When the pulse motor 76 is driven, the lead screw 75 is rotated to reciprocate the shutter 73 in the directions indicated by an arrow in FIG. 15. As the shutter unit 73 is moved, character data is written on the photosensitive drum 12 in the longitudinal direction.

Figure 16:
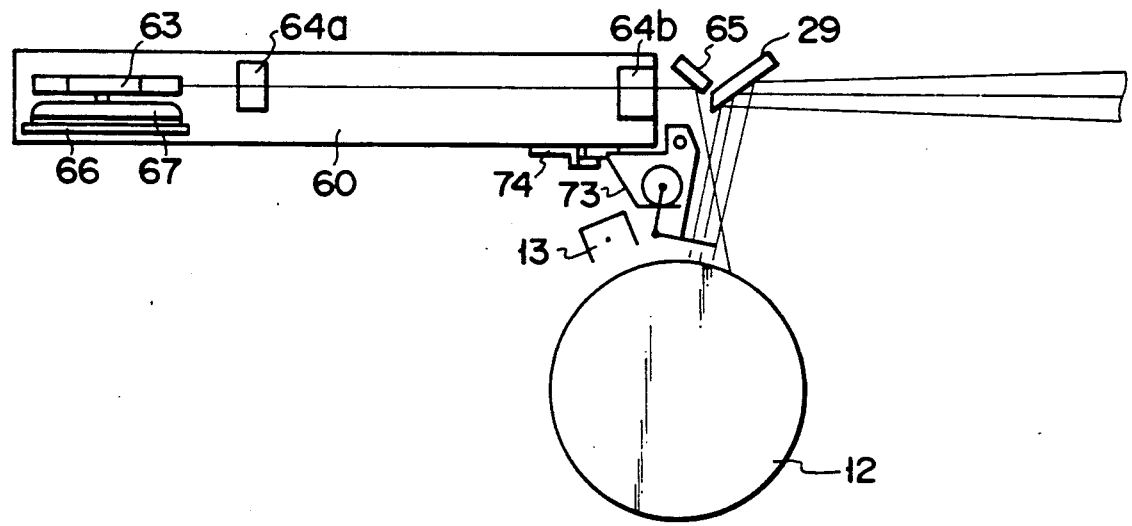

FIG. 16 is a sectional view of the shutter unit 73. A guide unit 74 is provided in the right-hand side of FIG. 16 to abut against one end of the shutter unit 73 to guide it.

The shutter unit 73 is reciprocated along the guide 74.

Figure 17:
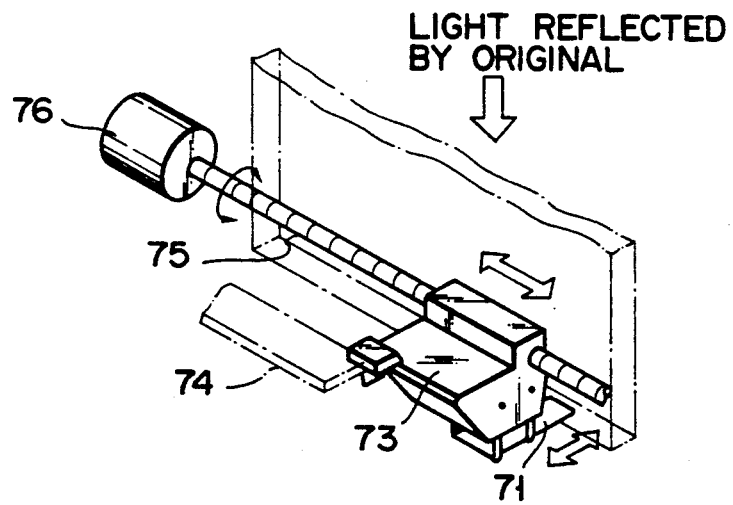

FIG. 17 shows a state in which the shutter unit 73 is irradiated with the light reflected by the original in order to write an image and a character.

Figure 18:
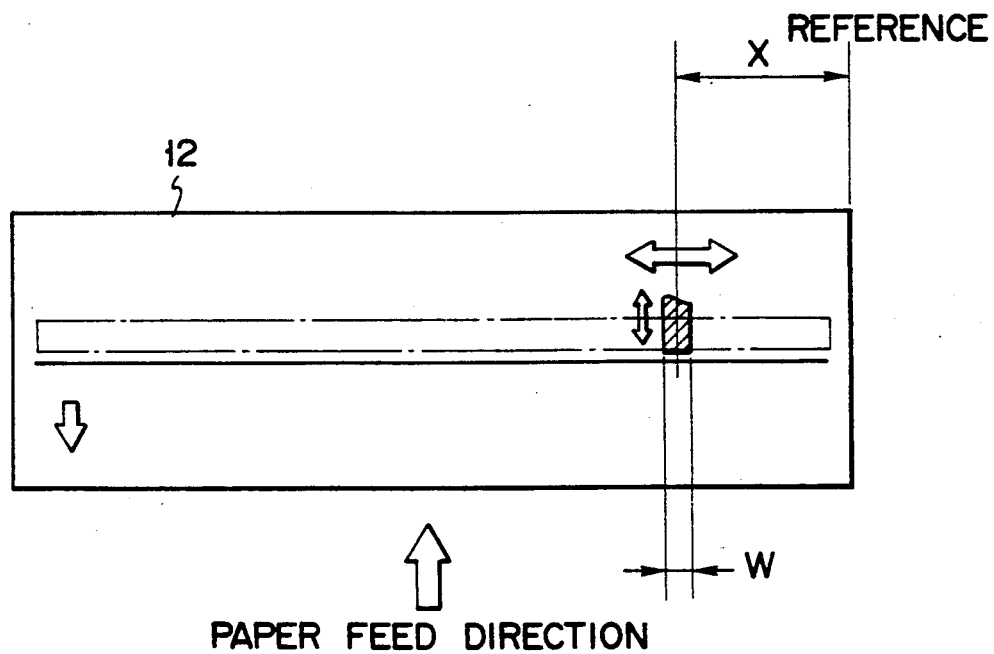
FIGS. 18 and 19 are views showing the position and the size of the shutter.
Figure 19:
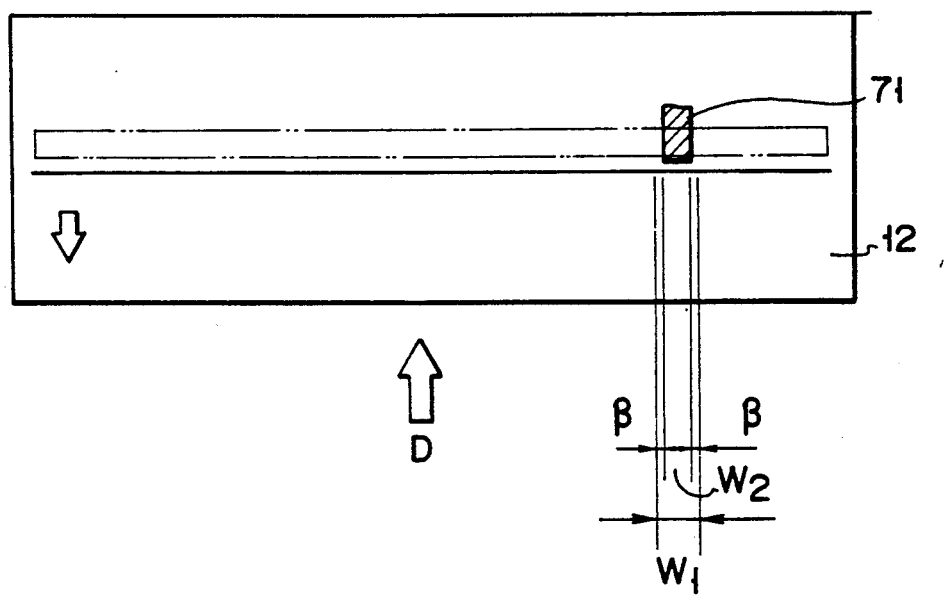

As shown in FIGS. 18 and 19, a width $W_1$ of the laser light beam emitted by the laser unit 60 is longer than a width $W_2$ of the shadow of the shutter 71 at the exposure position by $\beta$ at two sides thereof.

When the width $W_2$ of the shadow at the exposure position is set to be equal to or smaller than the width $W_1$ of the laser light beam, the light Bi reflected by the original is blocked by the width $W_2$ of the shadow at the exposure position, and the width of charges remaining on the photosensitive drum 12 becomes larger than the width $W_1$ of the laser light beam. As a result, all the charges cannot be erased by the laser light. Upon development, portions corresponding to the two sides of the width $W_1$ of the laser light beam become black lines.

However, when the width $W_1$ of the laser light beam is set to be larger than the width $W_2$ of the shadow at the exposure position by $\beta$ at the two sides thereof, as described above, charge is not left on the photosensitive drum 12.

When character data is to be written on the photosensitive drum 12, the shutter 71 is moved to a position to block the light Bi reflected by the original. A shift amount X of the shutter 71 is determined with reference to the right end of the photosensitive drum in FIG. 18.

Figure 20:
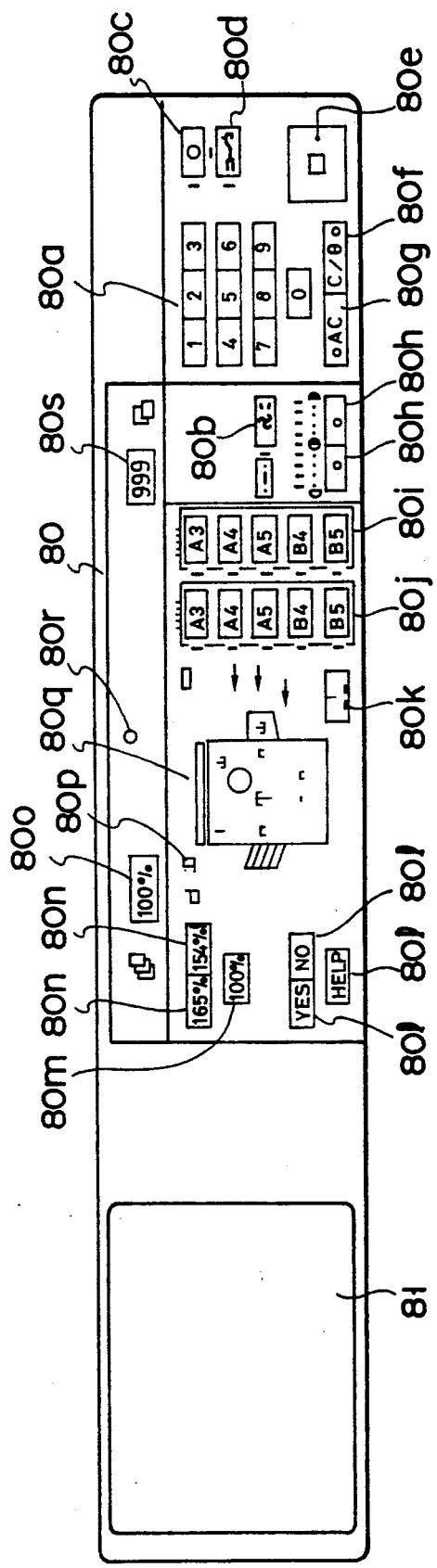
FIG. 20 is a plan view showing the arrangement of an operation panel.

The operation panel 80 provided on the copying machine 1 has the arrangement as shown in FIG. 20.

More specifically, the operation panel 80 comprises ten keys 80a, an automatic exposure key 80b, a preheat key 80c, an interrupt key 80d, a copy key 80e, a clear/stop key 80f, an all clear key 80g, density setting keys 80h, paper size keys 80i, original size keys 80j, cassette selection keys 80k, operation guide keys l, an equi-magnification key 80m, zoom keys 80n, a magnification indicator 80o, original direction indicators 80p, an operation state indicator 80q, a message display 80r, and a copy count indicator 80s.

A copy count is set by the ten keys 80a. Automatic exposure is set by the automatic exposure key 80b. Preheat is selected by the preheat key 80c. An interruption during continuous copying is selected by the interruption key 80d. Copy start is designated by the copy key 80e. The clear/stop key 80f is depressed when a copy count is to be corrected or when a copying operation is to be stopped. All the copy modes are returned to a standard mode by the all clear key 80g. A copy density is set by the density setting keys 80h. Paper size is selected by the paper size keys 80i. Original size is selected by the original size keys 80j. The cassette selection keys 80k are used to select a cassette. The operation guide keys 80l are used to decide whether to display the operation sequence guide. The equi-magnification key 80m is used to return the copying magnification to the equi-magnification. The zoom keys 80n are selectively depressed to change the magnification. The magnification indicator 80o displays the selected magnification.

The original direction indicators 80p indicate the original set directions. The operation state indicator 80q indicates the operation state. The message display 80r displays characters to indicate an operation sequence and the machine state. The copy count indicator 80s indicates the copy count set by the ten keys 80a.

The control system of this image forming apparatus will be described with reference to the block diagram of FIG. 1.

The copying machine 1 has a main controller 101 to control the entire copying machine 1.

The main controller 101 is connected to the operation panel 80, a character generator 102, a copying section 103, a memory 104, a motor driver 105, a laser scanner driver 100, and a light-receiving section 106. Various copying conditions are input at the operation panel 80.

The character generator 102 generates a character pattern consisting of a dot pattern corresponding to a character designated by the operation panel 80 and the like. The copying section 103 copies an image of an original. The memory 104 stores a control program. It can also store image data and editing condition data such as a trimming area transferred from the electronic notebook 2. The motor driver 105 drives the motors 70 and 76 used in the copying section 103. The laser scanner driver 100 drives the semiconductor laser 62 (to be described later) used in the copying section 103. The light-receiving section 106 receives a signal from the light-emitting section 9 in the electronic notebook 2.

The main controller 101 is also connected to a pulse motor 114 of the reader section 110 through the driver 107, and to the CCD 113 of the reader section 110 through an amplifier 108 and an A/D converter 109.

When the main controller 101 receives a signal from the electronic notebook 2, it sends a connection enquiry to the controller 6 of the electronic notebook 2 at predetermined time points. When no response is sent back by the electronic notebook 2 to this enquiry, the main controller 101 determines to disconnect the electronic notebook 2. When disconnection of the electronic notebook 2 is determined and processing for data sent from the electronic notebook 2 is completed, the main controller 101 clears or resets image data or data such as editing conditions like a trimming area sent from the electronic notebook 2 and stored in the memory 104.

The electronic notebook 2 has the controller 6 for controlling its entire operation. The controller 6 is connected to the mode key section 2a, the ten key/arithmetic key section 2b, the display section 2c, the touch panel 2d, a ROM 7 storing the control program, a RAM 8 storing data such as the telephone number list, the schedule, the memorandum, the calendar, and the like, and the light-emitting section 9.

The controller 6 is selectively connected to various IC cards 5 inserted in the card insertion port 2e through a connector (not shown).

The IC card 5 incorporates a ROM 5a storing a control program and a data storage RAM 5b storing data such as an editing condition like a trimming area.

The operation of the present invention having this arrangement will be described.

Figure 21:
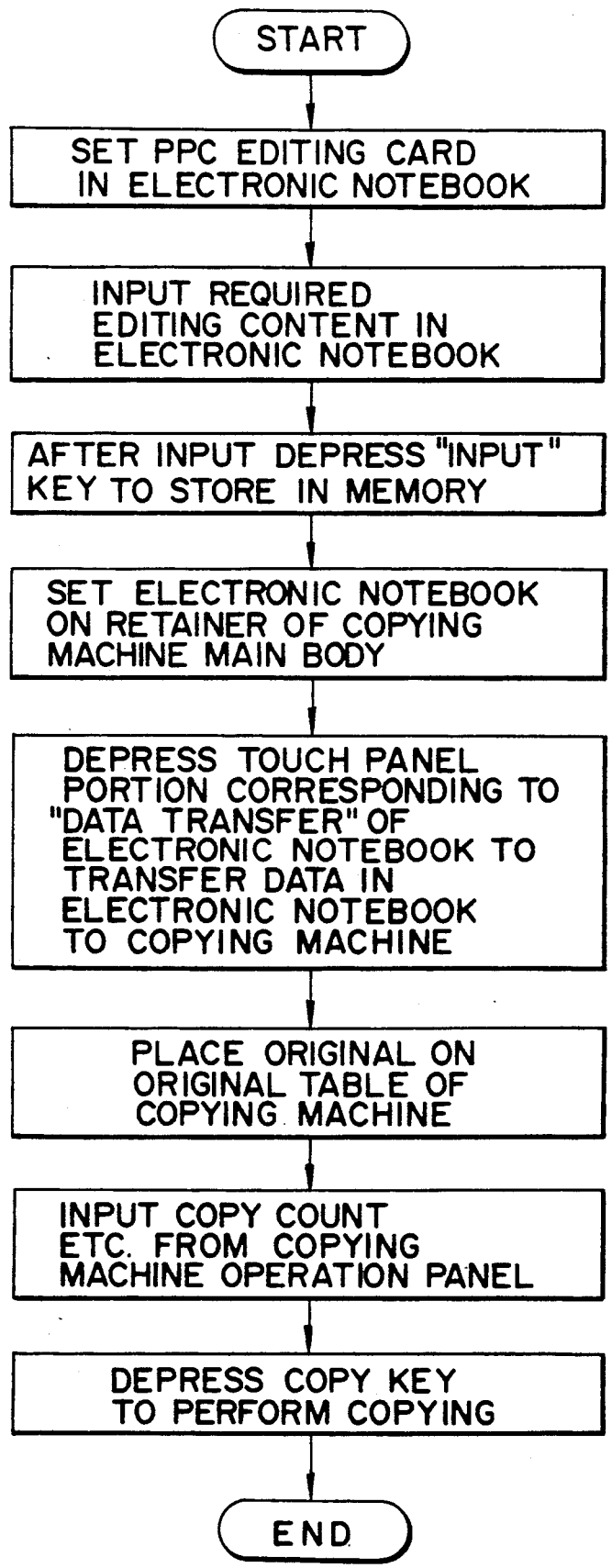
FIG. 21 is a flow chart for explaining an editing condition input operation by an electronic notebook and a printout operation by a copying machine in accordance with the editing condition.

First, inputting of an editing condition by the electronic notebook 2 and printing out by the copying machine 1 in accordance with the editing condition will be described with reference to the flow chart shown in FIG. 21.

Figure 22:
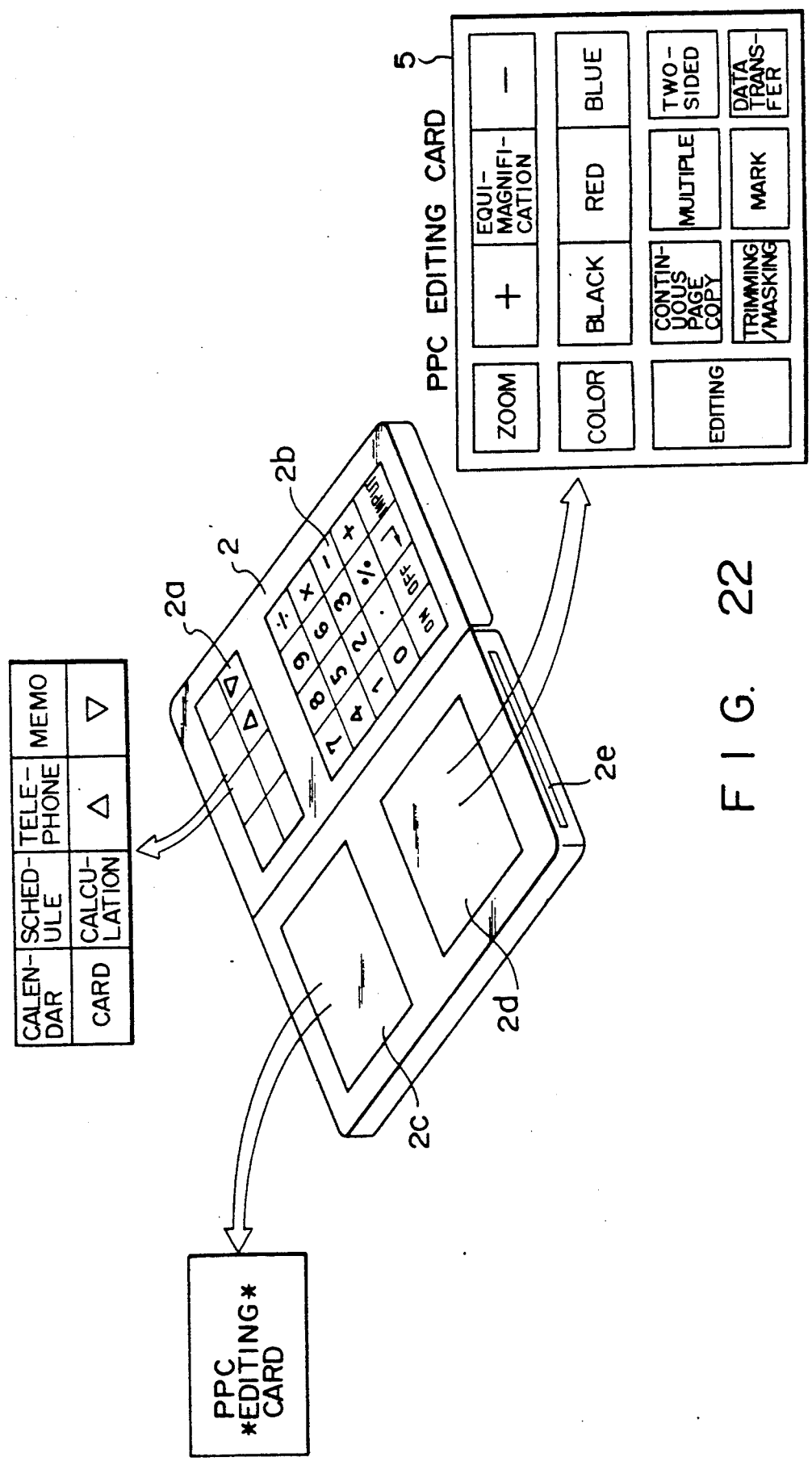
FIG. 22 is a perspective view of the electronic notebook in which a PPC editing card is set.

The PPC editing card 5 is set by inserting it through the card insertion port 2e, as shown in FIG. 22, and the ON key of the ten key/arithmetic key section 2b is depressed. Then, the controller 6 discriminates the previous operation mode and displays it on the display 2c.

When the operation mode is the card mode, the controller 6 discriminates the card currently set and displays the card title "PC editing card" on the display 2c, as shown in FIG. 23A to 23H. When the operation is other than the card mode, the card key of the mode key section 2a is depressed to set the card mode.

Subsequently, when a portion of the touch panel 2d corresponding to "zoom" and then a portion corresponding to "equi-magnification" are depressed, the controller 6 discriminates that the copying magnification is equi-magnification, and "zoom, 100%" is displayed on the display 2c, as shown in FIG. 23A.

Subsequently, when a portion of the touch panel 2d corresponding to "color" and then a portion corresponding to "black°" are depressed, the controller 6 discriminates that the black copy mode is set, and "color, black" is displayed on the display 2c, as shown in FIG. 23B.

Subsequently, when a portion of the touch panel 2d corresponding to "editing" is depressed, the controller 6 discriminates that the editing mode is set, and "Following editing available. Continuous page copy, multiple, two-sided, trimming/masking, mark" is displayed on the display 2c, as shown in FIG. 23C.

Subsequently, when a portion of the touch panel 2d corresponding to "continuous page copy" is depressed, the controller 6 discriminates that continuous page copy mode is set, and "continuous page copy" is displayed on the display 2c, as shown in FIG. 23D.

Figure 23E:
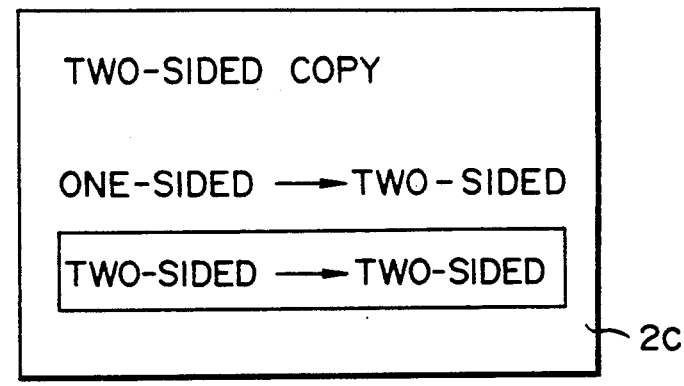

Subsequently, when a portion of the touch panel 2d corresponding to "two-sided" is depressed, the controller 6 discriminates that the two-sided copy mode is set, and "two-sided copy, one-sided→two-sided, two-sided→two-sided" is displayed on the display 2c, as shown in FIG. 23E. In this case, when one of the mode switching keys of the mode key section 2a is depressed, either two-sided copy from two one-sided sheets or two-sided copy from a two-sided sheet is selected.

When a portion of the touch panel 2d corresponding to "trimming/masking" is depressed, the controller 6 discriminates that the trimming/masking mode is set, and "trimming/masking mode, trimming, masking" is displayed on the display 2c. In this case, when the portion of the touch panel 2d corresponding to "trimming/masking" is depressed once, trimming is selected; when depressed twice, masking is selected.

Figure 23F:
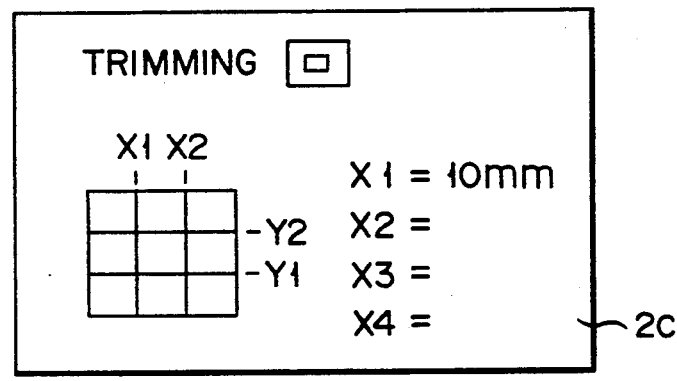

If trimming is selected, the controller 6 displays "trimming area set, X1=, X2=, Y1=, Y2=" on the display 2c as shown in FIG. 23F, to suggest inputting of respective coordinates.

In response to this prompt, the operator measures the size of the portion of the original to be trimmed by, e.g., a scale on his desk and inputs the respective coordinates by the ten keys of the ten key/arithmetic the mode key section 2a is depressed, the content of the coordinate to be input is changed.

Figure 23G:
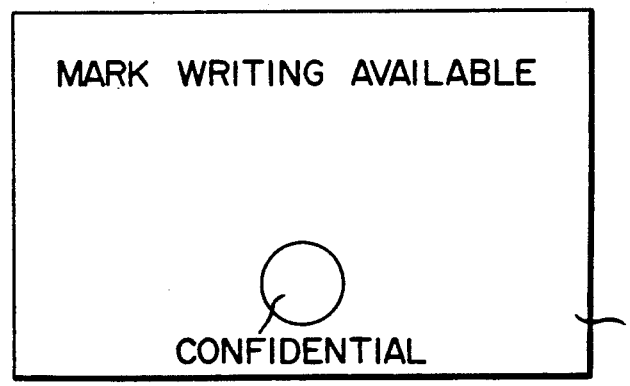

When a portion of the touch panel 2d corresponding to "mark" is depressed, the controller 6 displays "mark writing available" on the display 2c, as shown in FIG. 23G. In this case, when one of the switching keys of the mode key section 2a is depressed, one of various marks (confidential, reference, please circulate, . . . ) is selected. The selected mark is written on, e.g., the upper left corner of the sheet P.

Figure 23H:
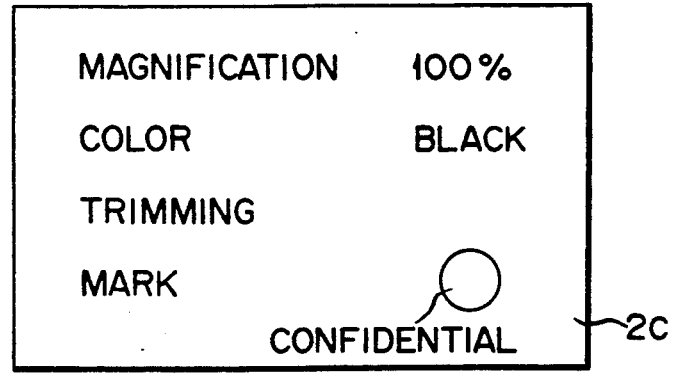

When the input key of the ten key/arithmetic key section 2b is turned on, the controller 6 discriminates that data input has finished and stores the contents of the respective selected modes in the RAM 5b of the PPC editing card 5. The controller 6 also displays "magnification: 100%, color: black, trimming, mark" on the display 2c, as shown in FIG. 23H.

Figure 24:
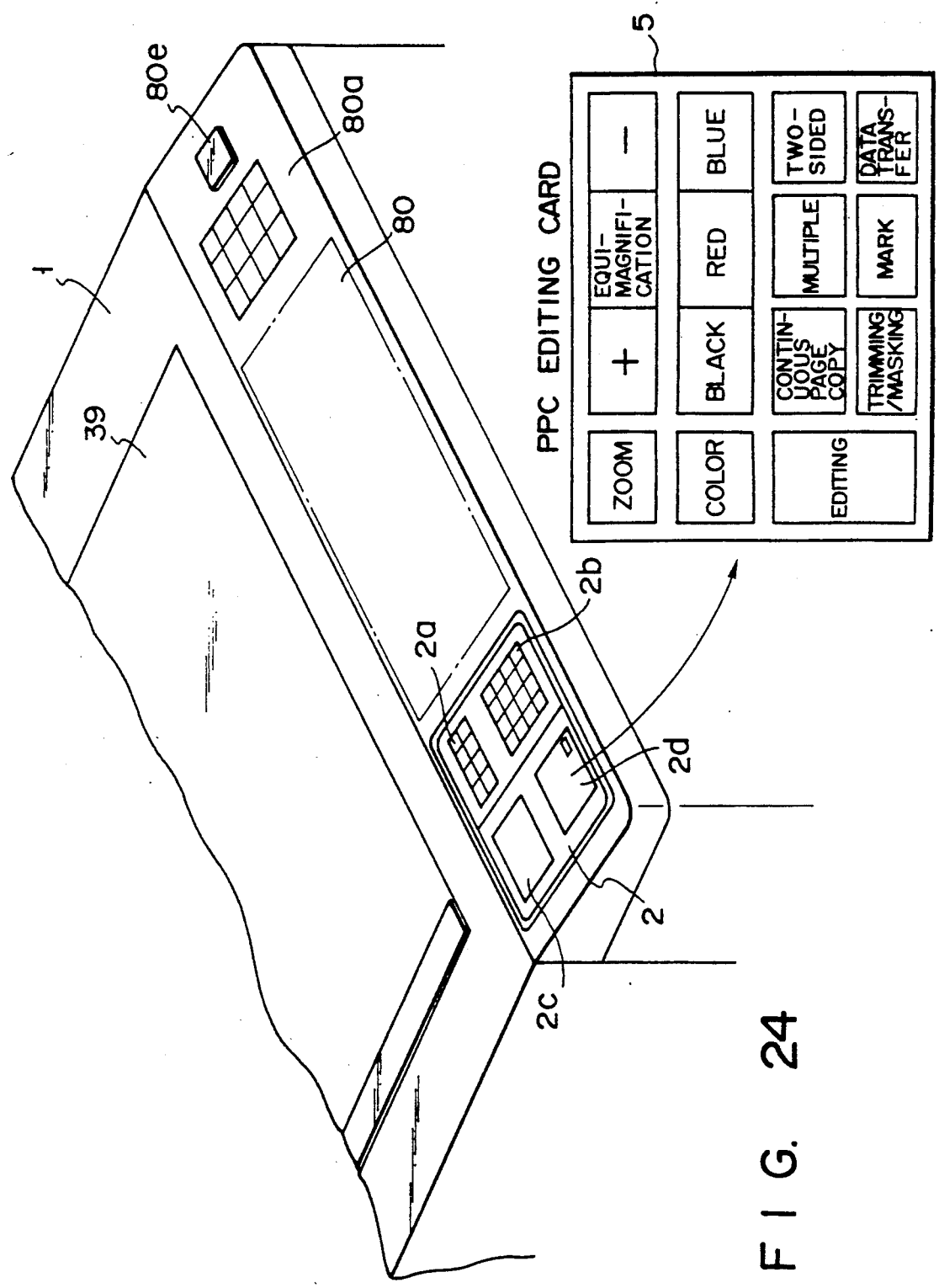

Then, the electronic notebook 2 is loaded on the main body retainer 81, as shown in FIG. 24, and a portion of the touch panel 2d of the electronic notebook 2 corresponding to "data transfer" is depressed. Upon this depression, the controller 6 of the electronic notebook 2 reads out the contents of the respective selected editing modes stored in the RAM 5b of the PPC editing card 5 and sends the data from the light-emitting section 9 to the light-receiving section 106 of the copying machine 1 in the form of optical data.

The light-receiving section 106 of the copying machine 1 receives the optical data sent from the light-emitting section 9 of the electronic notebook 2 and outputs it to the main controller 101 in the form of an electrical signal. The main controller 101 causes the memory 104 to store the data sent from the light-receiving section 106, i.e., editing conditions such as a trimming area.

Subsequently, an original is placed on the original table 38, a copying condition such as a copy count is input through the operation panel 80, and the copy key 80e is turned on. Upon this depression, the main controller 101 causes the copying section 103 to perform copying in accordance with the copying condition set by the electronic notebook 2 and stored in the memory 104 and the copying condition set by the operation panel 80.

As a result, the original placed on the original table 38 is copied at a magnification of 100%, in black, with the designated area trimmed, and with the confidential mark added.

More specifically, the original placed on the original table 38 is scanned by the exposure system 21. Scanning light reflected by the original is focused on the photosensitive drum 12 having the surface charged by the charger 13, thereby forming an electrostatic image on the photosensitive drum 12.

The main controller 101 drives the shutter 71 in accordance with the trimming area stored in the memory 104 to block the light reflected by the original.

The main controller 101 also drives the shutter 71 in accordance with the mark print position on the upper left corner of the sheet to block the light reflected by the original. As a result, the semiconductor laser 62 performs exposure and light scanning with a character pattern corresponding to the confidential mark created by the character generator 102.

Then, the laser light emitted by the semiconductor laser 62 is guided onto the photosensitive drum 12 by the mirror 65 through the polygon mirror 63 and the focusing lenses 64a and 64b. As a result, a character data latent image is formed on the photosensitive drum 12.

When a developing agent is supplied to the photosensitive drum 12 by the developing unit 15 or 16, the electrostatic image on it is visualized. At this time, when a paper sheet P is fed from the paper cassette 30 or 31, the large-capacity paper feed unit 52, or the manual feed section 53, it is sent to the image transfer section 12a between the photosensitive drum 12 and the transfer charger 17, and the visual image on the photosensitive drum 12 is transferred on it.

The image-transferred paper sheet P is separated from the photosensitive drum 12 by the operation of the separation charger 18 and sent to the fixing unit 35 by the conveyor belt 34 so that the image is fixed on the sheet P. The image-fixed paper sheet P is discharged by the discharge rollers 36 onto the uppermost bin 46 through the gate means 47 of the sorter unit 45.

In this manner, the paper sheet P as the copy of the original at a magnification of 100%, in black, with the designated area trimmed, and with the confidential mark added is printed out.

A case will be described in which masking is selected by the editing data from the electronic notebook 2 and the masking area is encircled by a special pen using a special color such as blue ink.

An original is placed on the original table 38, a copy count and the like are input by using the operation panel 80, and the copy key 80e is turned on. Then, the main controller 101 causes the copying section 103 to perform copying in accordance with the copying condition set by the electronic notebook 2 and stored in the memory 104 and the copying condition set by the operation panel 80.

For example, the original placed on the original table 38 is copied at a magnification of 100%, in black, with the portion surrounded in blue ink by the special pen masked.

More specifically, first, the main controller 101 drives the pulse motor 114 of the reader section 110 to insert the blue filter 112b i the optical path between the lens 111 and the CCD 113.

The original placed on the original table 38 is optically scanned by the exposure system 21, and the scanning light reflected by the original is guided to the CCD 13 through the blue filter 112B. The photoelectric conversion output of the CCD 113 is output to the main controller 101 through the amplifier 107 and the A/D converter 108. The main controller 101 causes the memory 104 to store the output digital signal.

Then, the main controller 101 drives the pulse motor 114 of the reader section 110 to insert the red filter 112R in the optical path between the lens 111 and the CCD 113.

The original placed on the original table 38 is optically scanned by the exposure system 21, and the scanning light reflected by the original is guided to the CCD 113 through the red filter 112R. The photoelectric conversion output of the CCD 113 is output to the main controller 101 through the amplifier 107 and the A/D converter 108. The main controller 101 causes the memory 104 to store in its another area the output digital signal from the A/D converter 108.

The main controller 101 then performs color discrimination of the image data stored in the memory 104. More specifically, e.g., addition and/or subtraction is performed between two types of image data, a blue portion of the original image is discriminated, and its position data is stored in the memory 104. As a result, the area surrounded in blue is stored in the memory 104 as the masking area.

Switching between the blue and red filters 112B and 112R may be performed twice upon forward and backward movements of the exposure system 21. Alternatively, the exposure system 21 may perform exposure scanning twice and switching may be performed upon the first and second exposure scanning cycles.

The original placed on the original table 38 is optically scanned by the exposure system 21 and the light reflected by the original is focused on the photosensitive drum 12 having the surface charged by the charger 13, thereby forming an electrostatic latent image on the photosensitive drum 12.

The main controller 101 drives the shutter in accordance with the masking area stored in the memory 104 to block the light reflected by the original.

The electrostatic latent image on the photosensitive drum 12 is visualized when the developing agent is supplied from the developing unit 15 or 16. At this time, a paper sheet P is supplied from the paper cassette 30 or 31, the large-capacity paper feed unit 52, or the manual feed section 53, and is sent to the image transfer section 12a between the photosensitive drum 12 and the transfer charger 17. Then, the visual image on the photosensitive drum 12 is transferred onto the paper sheet P.

The image-transferred paper sheet P is separated from the photosensitive drum 12 by the operation of the separation charger 18 and is sent to the fixing unit 35 by the conveyor belt 34 so that the image is fixed. The image-fixed paper sheet P is discharged by the discharge rollers 36 onto the uppermost bin 46 through the gate means 47 of the sorter unit 46.

In this manner, the paper sheet P as the copy of the original at a magnification of 100%, in black, and with the designated area masked is printed out.

For example, a paper sheet P as shown in FIG. 26 is printed out as the copy of an original shown in FIG. 25 with the original portion surrounded in blue ink M1 masked, namely, deleted.

A case will be described in which mark addition is selected by the editing data from the electronic notebook 2 and the start of the mark write area is designated using a special pen having a special color agent, e.g., a blue ink.

An original is placed on the original table 38, a copy count and the like are input by using the operation panel 80, and the copy key 80e is turned on. Then, the main controller 101 causes the copying section 103 to perform copying in accordance with the copying condition set by the electronic notebook 2 and stored in the memory 104 and the copying condition set by the operation panel 80.

For example, the original placed on the original table 38 is copied at a magnification of 100% in black with the mark written at the position designated by blue ink.

More specifically, first, the blue portion of the original is discriminated in the same manner as discrimination of the masking area surrounded in blue ink described above, and its position data is stored in the memory 104. As a result, the position data of the blue portion is stored in the memory 104 as the mark start position.

The original placed on the original table 38 is optically scanned by the exposure system 21, and the scanning light reflected by the original is focused on the photosensitive drum 12 having the surface charged by the charger 13, thereby forming an electrostatic latent image on the photosensitive drum 12.

The main controller 101 drives the shutter in accordance with the mark start position stored in the memory 104 to block the light reflected by the original. A character pattern corresponding to the mark stored in the memory 104 is generated by the character generator 102 and output to the semiconductor laser 62, and the semiconductor laser 62 performs exposure scanning. Then, light emitted by the semiconductor laser 62 is guided onto the photosensitive drum 12 by the mirror 65 through the polygon mirror 63 and the focusing lens 64a and 64b.

The electrostatic latent image on the photosensitive drum 12 is visualized when the developing agent is supplied from the developing unit 15 or 16. At this time, a paper sheet P is supplied from the paper cassette 30 or 31, the large-capacity paper feed unit 52, or the manual feed section 53 and is sent to the image transfer section 12a between the photosensitive drum 12 and the transfer charger 17. Then, the visual image on the photosensitive drum 12 is transferred onto the paper sheet P.

The image-transferred paper sheet P is separated from the photosensitive drum 12 by the operation of the separation charger 18 and is sent to the fixing unit 35 by the conveyor belt 34 so that the image is fixed. The image-fixed paper sheet P is discharged by the discharge rollers 36 onto the uppermost bin 46 through the gate means 47 of the sorter unit 45.

In this manner, the paper sheet P as the copy of the original at a magnification of 100%, in black, and with a mark written at the designated position is printed out.

Figure 27:
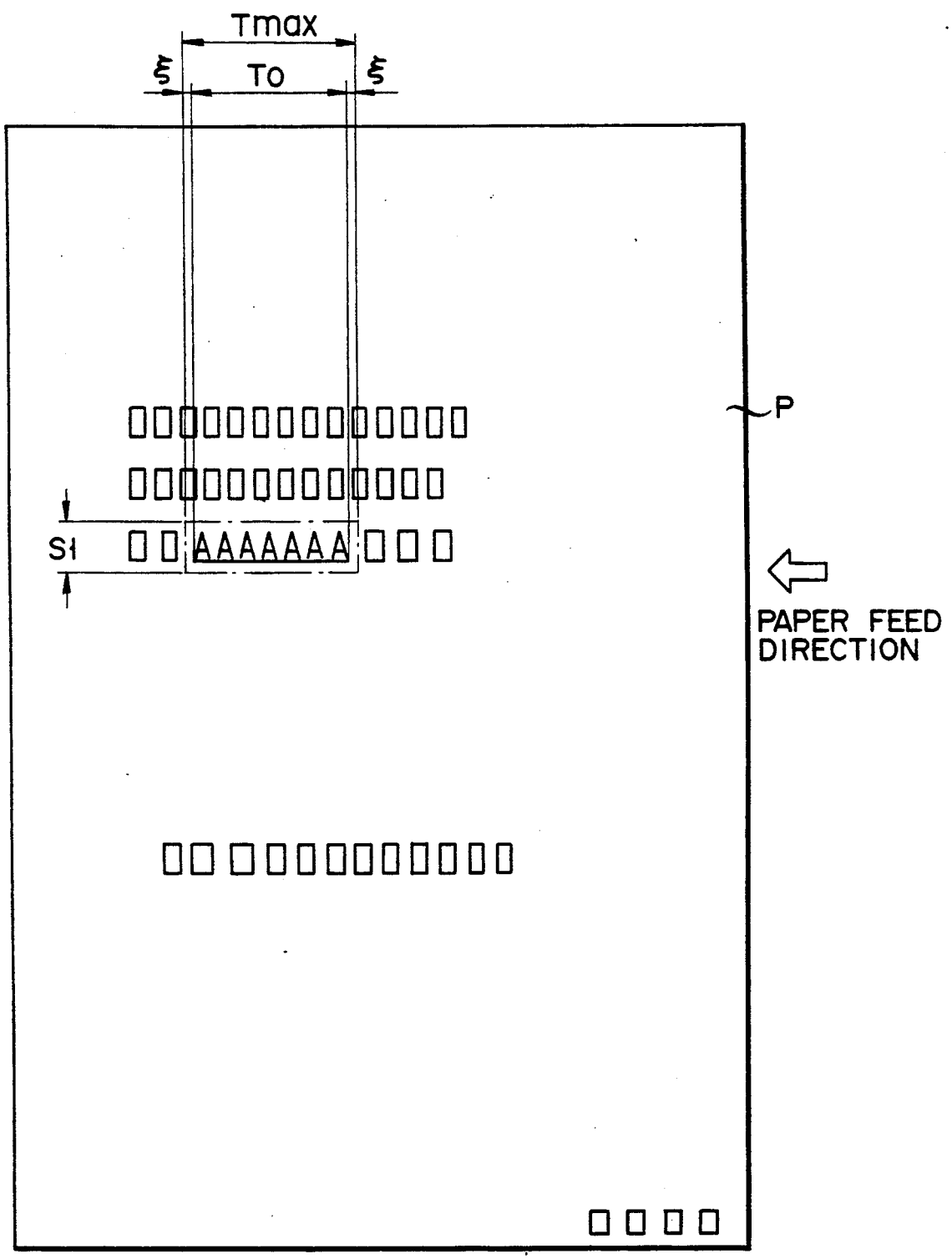
FIG. 27 shows a printout example of a copy when a mark is written.

For example, assume an original as shown in FIG. 25. A paper sheet P shown in FIG. 27 as its copy is printed out with the portion following the write position designated in blue ink M2 being changed to marks (AAAAAAA). In this case, a mark write length "$T_0$", a shutter ON/OFF time "$\xi$", and a laser radiation length "$T_{max}$" are predetermined. A character in an area "$T_{max} \times S1$" is deleted and a mark (character) is written in the area.

Figure 28:
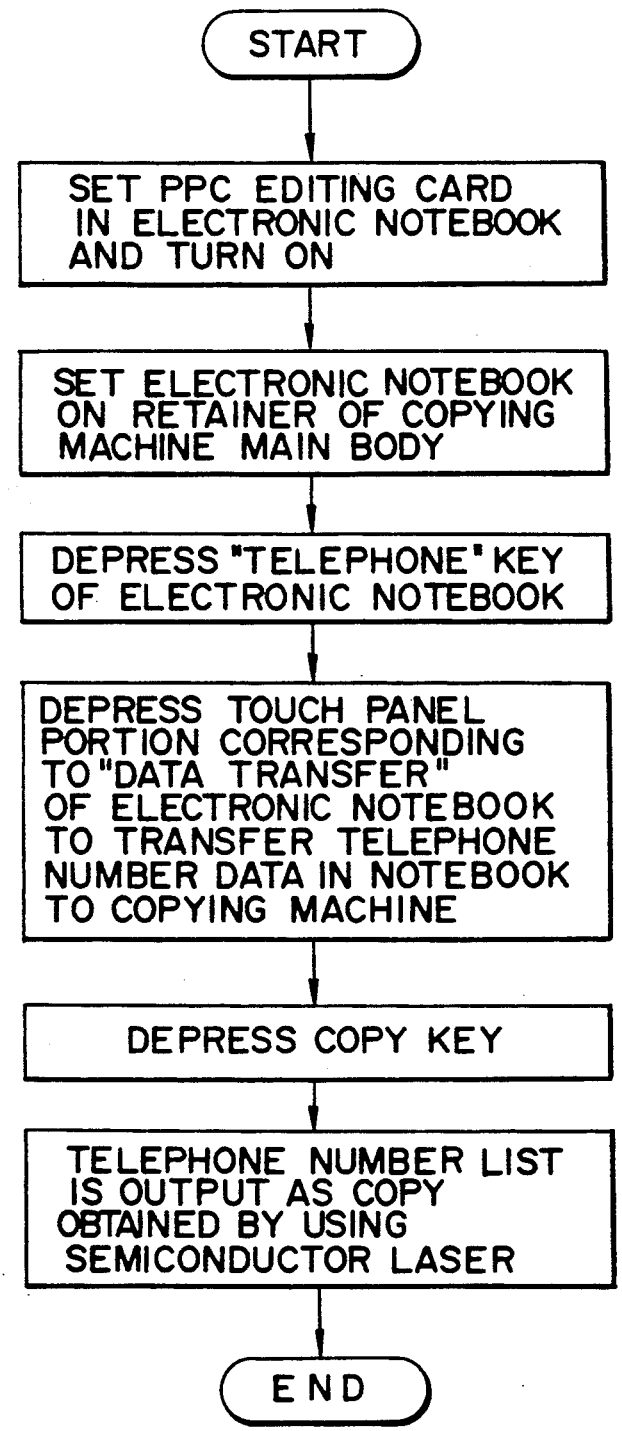
FIG 28 is a flow chart for explaining an operation when a telephone number list in the electronic notebook is to be printed out by the copying machine.

A case in which a telephone number registered in the electronic notebook 2 is to be printed out by the copying machine 1 will be described with reference to the flow chart of FIG. 28. First, the PPC editing card 5 is set by inserting through the insertion port 2e, and the ON key of the ten key/arithmetic key section 2b is turned on.

Figure 29:
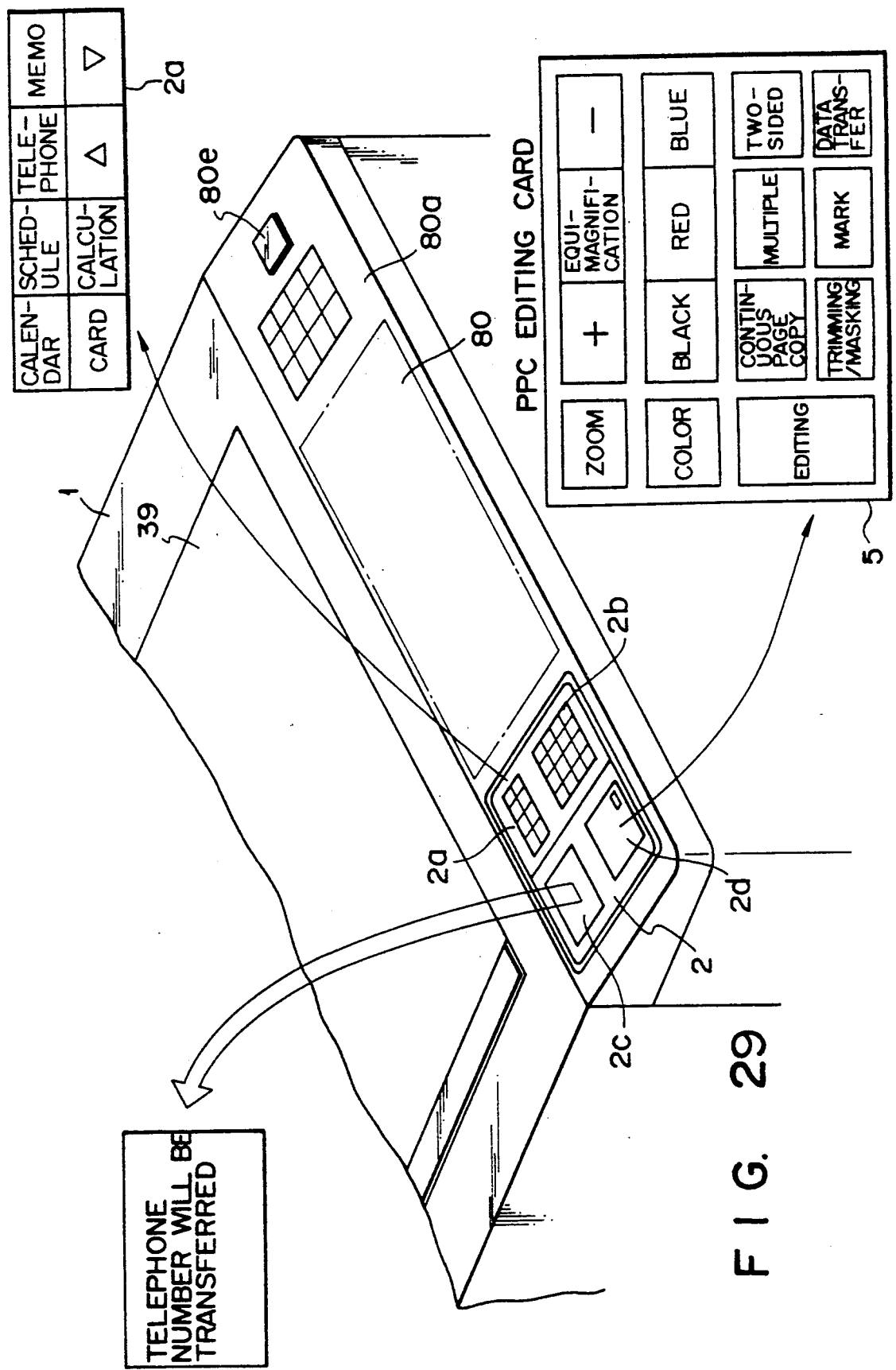

Subsequently, as shown in FIG. 29, the electronic notebook 2 is loaded on the main body retainer 81, and the telephone key of the mode key section 2a is depressed. Then, the controller 6 of the electronic notebook 2 displays "telephone number?" on the display 2c, as shown in FIG. 30A.

Then, a portion of the touch panel 2d of the electronic notebook 2 corresponding to data transfer is depressed. Then, the controller 6 of the electronic notebook 2 discriminates that transfer of the telephone number list is designated, reads out the telephone number list stored in the RAM 8, and transmits the telephone number list to the light-receiving section 106 of the copying machine 1 from the light-emitting section 9 in the form of optical data.

During transmission of the telephone number list, the controller 6 displays "during transmission" on the display 2c, as shown in FIG. 30B. When transmission of the telephone number list is completely finished, the display 2c displays "end of transmission", as shown in FIG. 30C. The light-receiving section 106 of the copying machine 1 receives the optical data sent from the light-emitting section 9 of the electronic notebook 2 and outputs it to the main controller 101 in the form of an electrical signal. The main controller 101 causes the memory 104 to store data sent from the light-receiving section 106, i.e., the telephone number list.

Then, the copy key 80e is turned on. Upon this ON operation, the main controller 101 reads out the telephone number list stored in the memory 104, converts it to a character pattern 104 by the character generator 102, and stores it again in the memory 104. The main controller 101 also outputs a drive signal corresponding to the character pattern stored in the memory 104 to the laser scanner driver 106. Then, the semiconductor laser 62 performs exposure and scanning, and the copying section 103 performs copying.

More specifically, the laser light emitted by the semiconductor laser 62 is guided onto the photosensitive drum 12 by the mirror 65 through the polygon mirror 63 and the focusing lenses 64a and 64b to form a character data latent image on the photosensitive drum 12. The electrostatic latent image on the photosensitive drum 12 is visualized when the developing agent is supplied from the developing unit 15 or 16. At this time, a paper sheet P is supplied from the paper cassette 30 or 31, the large-capacity paper feed unit 52, or the manual paper feed section and is sent to the image transfer section 12a between the photosensitive drum 12 and the transfer charger 17 so that the visual image on the photosensitive drum 12 is transferred onto the paper sheet P.

The image-transferred paper sheet P is separated from the photosensitive drum 12 by the operation of the separation charger 18 and is sent to the fixing unit 35 by the conveyor belt 34 to fix the image thereon. The image-fixed paper sheet P is discharged by the discharge rollers 36 onto the uppermost bin 46 through the gate means 47 of the sorter unit 45.

In this manner, the telephone number list transferred from the electronic notebook 2 is printed out on the paper sheet P, as shown in FIG. 31A.

A memo list of the electronic notebook 2 can be printed out by the copying machine 1 in the same manner as the telephone number list. For example, it is printed out on a paper sheet P, as shown in FIG. 31B.

As has been described above, a copying condition such as a masking or trimming area is set in advance by the electronic notebook. When the electronic notebook 2 is loaded on the copying machine, the preset copying condition is transmitted from the electronic notebook to the copying machine. The copying machine performs copying in accordance with the transmitted copying condition. The telephone number list and the memo list stored in the electronic notebook can be transmitted to the copying machine to be printed out.

As a result, the electronic notebook and its exclusive IC card can be used as part of the operation panel of the copying machine main body, thus simplifying the operation panel of the copying machine main body. Since the electronic notebook is portable, a copying condition can be input restfully at an arbitrary place.

The telephone number list and the memo list stored in the electronic notebook can be printed out at a high speed. A blue portion of the original not to be reproduced in the copy can be discriminated, and writing of a mark and the like, masking, and trimming can be performed by using the discriminated content.

Since area designation for trimming and masking is performed in advance by using the electronic notebook, the time the operator occupies the copying machine can be shortened, leading to efficient utilization of the copying machine.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus, comprising:
   means for forming an image on an image carrier under predetermined conditions;
   means for storing data representing the predetermined conditions under which said image forming means is to form an image;
   means, detachably connected to said image forming means, for supporting said storing means;
   means, attached to said supporting means, for changing the data stored in said storing means, when said supporting means is detached from said image forming means; and
   means for setting conditions under which said image forming means is to form an image and which are represented by the data stored in said storing means, when said supporting means is attached to the said image forming means.

2. An image forming apparatus according to claim 1, wherein said storing means includes auxiliary storing means for storing data representing an area in which said image forming means is to form an image.

3. An image forming apparatus according to claim 2, wherein said supporting means includes means for displaying the area represented by the data stored in said auxiliary storing means.

4. An image forming apparatus according to claim 1, wherein said setting means includes data receiving means for receiving the data stored in said storing means.

5. An image forming apparatus according to claim 4, wherein said setting means includes a storing device for storing the data received by said data receiving means.

6. An image forming apparatus according to claim 5, wherein said setting means includes means for resetting the data stored in said storing device corresponding to an operation which said supporting means is detached from said image forming means.

7. An image forming apparatus according to claim 1, wherein said image forming means includes a main image forming device for forming an image corresponding to an original image and an auxiliary image forming device for forming an additional image different from the original image.

8. An image forming apparatus according to claim 7, wherein said storing means includes additional data storing means for storing additional data representing the additional image formed by said auxiliary image forming device.

9. An image forming apparatus, comprising:
   means for forming an image on an image carrier under predetermined conditions;
   first storing means for storing data representing the predetermined conditions under which said image forming means is to form an image;
   means, detachably connected to said image forming means, for supporting said first storing means;
   means, attached to said supporting means, for changing the data stored in said first storing means, when said supporting means is detached from said image forming means;
   means for setting conditions under which said image forming means is to form an image and which are represented by the data stored in said first storing means, when said supporting means is attached to the said image forming means;

means for receiving the data stored in said first storing means;

second storing means for storing the data received by said data receiving means; and means for resetting the data stored in said second storing means corresponding to an operation which said supporting means is detached from said image forming means.

10. An image forming apparatus according to claim 9, wherein said storing means includes auxiliary storing means for storing data representing an area in which said image forming means is to form an image.

11. An image forming apparatus according to claim 10, wherein said supporting means includes means for displaying the area represented by the data stored in said auxiliary storing means.

12. An image forming apparatus according to claim 9, wherein said image forming means includes a main image forming device for forming an image corresponding to an original image and an auxiliary image forming device for forming an additional image different from the original image.

13. An image forming apparatus according to claim 12, wherein said storing means includes additional data storing means for storing additional data representing the additional image formed by said auxiliary image forming device.

* * * * *